US009955063B2

United States Patent
Ogata et al.

(10) Patent No.: US 9,955,063 B2
(45) Date of Patent: Apr. 24, 2018

(54) IMAGING SYSTEM AND IMAGING TERMINAL

(71) Applicant: Olympus Corporation, Hachioji-shi, Tokyo (JP)

(72) Inventors: Yoshihisa Ogata, Tokyo (JP); Manabu Tajima, Tokyo (JP); Keito Fukushima, Tokyo (JP); Kazuyuki Shibuya, Sagamihara (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/423,834

(22) Filed: Feb. 3, 2017

(65) Prior Publication Data

US 2017/0244886 A1 Aug. 24, 2017

(30) Foreign Application Priority Data

Feb. 22, 2016 (JP) ................. 2016-031370

(51) Int. Cl.
| | |
|---|---|
| H04N 5/232 | (2006.01) |
| H04L 1/08 | (2006.01) |
| H04L 12/761 | (2013.01) |
| H04N 5/247 | (2006.01) |
| H04L 1/00 | (2006.01) |

(52) U.S. Cl.
CPC ........... *H04N 5/23206* (2013.01); *H04L 1/08* (2013.01); *H04L 45/16* (2013.01); *H04L 2001/0093* (2013.01); *H04N 5/247* (2013.01)

(58) Field of Classification Search
CPC .... H04N 5/232; H04N 5/23206; H04N 5/247; H04N 1/001; H04N 1/00098; H04N 1/00106; H04N 1/00217; H04N 1/00228; H04N 1/00315; H04L 1/08; H04L 45/16

USPC .................................................... 348/207.11
See application file for complete search history.

(56) References Cited

U.S. PATENT DOCUMENTS

| | | | | |
|---|---|---|---|---|
| 5,550,756 A | * | 8/1996 | Ohmi ................. | H04N 21/2383 375/E7.002 |
| 7,701,487 B2 | * | 4/2010 | Dobrin .................. | H04N 5/073 348/159 |
| 8,284,254 B2 | * | 10/2012 | Romanowich ... | G08B 13/19608 348/143 |
| 8,687,077 B2 | * | 4/2014 | Choi .................. | G08B 13/1966 348/143 |

(Continued)

FOREIGN PATENT DOCUMENTS

| | | |
|---|---|---|
| JP | 2005-252568 | 9/2005 |
| JP | 2006-238020 | 9/2006 |

*Primary Examiner* — Pritham Prabhakher
(74) *Attorney, Agent, or Firm* — John C. Pokotylo; Pokotylo Patent Services

(57) ABSTRACT

It is possible to further reduce failure of simultaneous imaging performed by a plurality of imaging terminals. A second processor repeatedly transmits a specific multi-address packet in a first duration when a communication connection of a data link level with an imaging terminal 101 is not established. When a time point at which a first communication device 103 has received a specific multi-address packet is referred to as a first time point, a first processor 102 performs imaging control in response to the specific multi-address packet that has been received at the first time point and does not perform the imaging control in response to a specific multi-address packet that is newly received in the first duration after the first time point.

14 Claims, 20 Drawing Sheets

(56) References Cited

U.S. PATENT DOCUMENTS

| | | | |
|---|---|---|---|
| 8,914,070 B2* | 12/2014 | Wassingbo | H04N 1/00127 370/260 |
| 9,066,024 B2* | 6/2015 | Chang | H04N 5/247 |
| 9,609,182 B1* | 3/2017 | Millikan | H04N 5/225 |
| 2006/0174206 A1* | 8/2006 | Jung | H04N 1/00132 715/751 |
| 2007/0039030 A1* | 2/2007 | Romanowich | G08B 13/19608 725/105 |
| 2007/0216691 A1* | 9/2007 | Dobrin | H04N 5/073 345/473 |
| 2008/0291271 A1* | 11/2008 | Hansson | G08B 13/19684 348/143 |
| 2009/0086041 A1* | 4/2009 | Choi | G08B 13/1966 348/211.2 |
| 2010/0182428 A1* | 7/2010 | Lu | H04N 7/181 348/143 |
| 2010/0222107 A1* | 9/2010 | Wassingbo | H04N 1/00127 455/566 |
| 2010/0304731 A1* | 12/2010 | Bratton | H04N 5/232 455/420 |
| 2012/0113265 A1* | 5/2012 | Galvin | H04N 7/181 348/159 |
| 2014/0043495 A1* | 2/2014 | Bateman | H04N 7/181 348/207.11 |
| 2014/0267749 A1* | 9/2014 | Frigon | H04N 1/00244 348/159 |
| 2016/0021292 A1* | 1/2016 | Zhang | H04N 5/23206 348/211.2 |
| 2016/0323498 A1* | 11/2016 | Krishnakumar | H04N 5/23206 |
| 2017/0155476 A1* | 6/2017 | Polehn | H04L 1/08 |
| 2017/0214842 A1* | 7/2017 | Carr | H04N 5/23203 |

* cited by examiner

FIG. 14

| Flags | Service UUID | Control Command |||
|---|---|---|---|---|
| | | Code | Duration | Interval |

FIG. 15

| Flags | Service UUID | Control Command ||||
|---|---|---|---|---|---|
| | | Code | Duration | Interval | Packet No. |

IMAGING SYSTEM AND IMAGING TERMINAL

BACKGROUND OF THE INVENTION

Field of the Invention

The present invention relates to an imaging system and an imaging terminal. Priority is claimed on Japanese Patent Application No. 2016-031370, filed Feb. 22, 2016, the content of which is incorporated herein by reference.

Description of Related Art

It is known that, in a digital camera system in which a control device and a plurality of digital cameras establish connections (links) via a communication network, the control device serving as a host simultaneously controls imaging operations of the plurality of digital cameras remotely (for example, Japanese Unexamined Patent Application, First Publication No. 2006-238020).

SUMMARY OF THE INVENTION

An imaging system according to a first aspect of the present invention includes an imaging instruction terminal and an imaging terminal, wherein the imaging instruction terminal includes an imaging instruction terminal communication unit configured to wirelessly communicate with the imaging terminal; and an imaging instruction terminal control unit configured to perform control such that a specific multi-address packet of a data link level including a parameter indicating a first duration and an imaging instruction signal is transmitted to the imaging terminal, wherein the imaging terminal includes an imaging terminal communication unit configured to wirelessly communicate with the imaging instruction terminal; an imaging unit configured to capture an image; and an imaging terminal control unit configured to perform imaging control such that the imaging unit captures an image in response to the specific multi-address packet that is wirelessly transmitted from the imaging instruction terminal, wherein the imaging instruction terminal control unit repeatedly transmits the specific multi-address packet in the first duration when a communication connection of a data link level with the imaging terminal is not established, and wherein, when a time point at which the imaging terminal communication unit has received the specific multi-address packet is referred to as a first time point, the imaging terminal control unit performs the imaging control in response to the specific multi-address packet that has been received at the first time point and does not perform the imaging control in response to the specific multi-address packet that is newly received in the first duration after the first time point.

In addition, an imaging terminal according to a second aspect of the present invention includes an imaging terminal communication unit configured to wirelessly communicate with an imaging instruction terminal; an imaging unit configured to capture an image; and an imaging terminal control unit configured to perform imaging control such that the imaging unit captures an image in response to a specific multi-address packet of a data link level including a parameter indicating a first duration and an imaging instruction signal that is wirelessly transmitted from the imaging instruction terminal, wherein, when a time point at which the imaging terminal communication unit has received the specific multi-address packet is referred to as a first time point, the imaging terminal control unit performs the imaging control in response to the specific multi-address packet that has been received at the first time point, and does not perform the imaging control in response to the specific multi-address packet that is newly received in the first duration after the first time point.

In addition, an imaging terminal according to a third aspect of the present invention includes an imaging terminal communication unit configured to wirelessly communicate with an imaging instruction terminal; an imaging unit configured to capture a moving image; and an imaging terminal control unit configured to perform moving image imaging control such that the imaging unit starts to capture a moving image in response to a specific multi-address packet of a data link level including a parameter indicating a first duration and an imaging instruction signal that is wirelessly transmitted from the imaging instruction terminal, wherein, when a time point at which the imaging terminal communication unit has received the specific multi-address packet is referred to as a first time point, the imaging terminal control unit performs the moving image imaging control in response to the specific multi-address packet that has been received at the first time point, and does not perform the moving image imaging control in response to the specific multi-address packet that is newly received in the first duration after the first time point.

In addition, according to a fourth aspect of the present invention, in the imaging terminal according to the third aspect of the present invention, when the specific multi-address packet is received after the first duration has elapsed since the first time point, the imaging terminal control unit performs the moving image imaging control such that, if the moving image is being captured, capturing of a new moving image starts after ending the capturing of the moving image.

In addition, an imaging system according to a fifth aspect of the present invention includes an imaging instruction terminal and an imaging terminal, wherein the imaging instruction terminal includes an imaging instruction terminal communication unit configured to wirelessly communicate with the imaging terminal; and an imaging instruction terminal control unit configured to perform control such that a specific multi-address packet of a data link level including a parameter indicating a first duration, a parameter indicating a first interval or the number of transmissions, and an imaging instruction signal is transmitted to the imaging terminal, wherein the imaging terminal includes an imaging terminal communication unit configured to wirelessly communicate with the imaging instruction terminal; an imaging unit configured to capture an image; and an imaging terminal control unit configured to perform imaging control such that the imaging unit captures an image in response to the specific multi-address packet that is wirelessly transmitted from the imaging instruction terminal, wherein, when a communication connection of a data link level with the imaging terminal is not established, the imaging instruction terminal control unit repeatedly transmits the specific multi-address packet at the first interval, or according to the number of transmissions in the first duration, and wherein, when a time point at which the imaging terminal communication unit has received the specific multi-address packet is referred to as a first time point, the imaging terminal control unit performs the imaging control repeatedly at the first interval or according to the number of transmissions in the first duration in response to the specific multi-address packet that has been received at the first time point, and does not perform the imaging control in response to the specific multi-address packet that is newly received in the first duration after the first time point.

In addition, an imaging terminal according to a sixth aspect of the present invention includes an imaging terminal communication unit configured to wirelessly communicate with an imaging instruction terminal; an imaging unit configured to capture an image; and an imaging terminal control unit configured to perform imaging control such that the imaging unit captures an image in response to a specific multi-address packet of a data link level including a parameter indicating a first duration, a parameter indicating a first interval or the number of transmissions and an imaging instruction signal that is wirelessly transmitted from the imaging instruction terminal, wherein, when a time point at which the imaging terminal communication unit has received the specific multi-address packet is referred to as a first time point, the imaging terminal control unit performs the imaging control repeatedly at the first interval or according to the number of transmissions in the first duration in response to the specific multi-address packet that has been received at the first time point, and does not perform the imaging control in response to the specific multi-address packet that is newly received in the first duration after the first time point.

In addition, an imaging terminal according to a seventh aspect of the present invention includes an imaging terminal communication unit configured to wirelessly communicate with an imaging instruction terminal; an imaging unit configured to capture a moving image; and an imaging terminal control unit configured to perform moving image imaging control such that the imaging unit starts to capture a moving image in response to a specific multi-address packet of a data link level including a parameter indicating a first duration, a parameter indicating a first interval or the number of transmissions and an imaging instruction signal that is wirelessly transmitted from the imaging instruction terminal, wherein, when a time point at which the imaging terminal communication unit has received the specific multi-address packet is referred to as a first time point, the imaging terminal control unit performs the moving image imaging control in response to the specific multi-address packet that has been received at the first time point, performs control such that the parameters are superimposed as an index of the captured moving image and stored, and does not perform the moving image imaging control in response to the specific multi-address packet that is newly received in the first duration after the first time point.

In addition, an imaging terminal according to an eighth aspect of the present invention includes an imaging instruction terminal and an imaging terminal, wherein the imaging instruction terminal includes an imaging instruction terminal communication unit configured to wirelessly communicate with the imaging terminal; and an imaging instruction terminal control unit configured to perform control such that a specific multi-address packet of a data link level including a parameter indicating a first duration, a parameter indicating a first interval or the number of transmissions, a packet number that is calculated as a value that differs according to a unique rule for each transmission using a packet number of a specific multi-address packet that is initially transmitted as a starting point and an imaging instruction signal is transmitted to the imaging terminal, wherein the imaging terminal includes an imaging terminal communication unit configured to wirelessly communicate with the imaging instruction terminal; an imaging unit configured to capture an image; and an imaging terminal control unit configured to perform imaging control such that the imaging unit captures an image in response to the specific multi-address packet that is wirelessly transmitted from the imaging instruction terminal, wherein the imaging instruction terminal control unit repeatedly transmits the specific multi-address packet at the first interval or according to the number of transmissions in the first duration when a communication connection of a data link level with the imaging terminal is not established, and wherein, when a time point at which the imaging terminal communication unit has received the specific multi-address packet is referred to as a first time point, the imaging terminal control unit performs the imaging control repeatedly at the first interval or according to the number of transmissions in response to the specific multi-address packet that has been received at the first time point in the first duration and performs control such that, whenever an image is captured under the imaging control, the captured image is stored together with a value that is obtained according to the unique rule using a packet number of the specific multi-address packet that is received for the first time after the first time point as a starting point.

In addition, according to a ninth aspect of the present invention, in the imaging system according to the first aspect, the control unit performs may control such that the captured image is stored together with the parameter.

In addition, according to a tenth aspect of the present invention, in the imaging terminal according to the second aspect, the control unit performs control such that the captured image is stored together with the parameter.

In addition, according to an eleventh aspect of the present invention, in the imaging terminal according to the third aspect, the control unit performs control such that the captured moving image is stored together with the parameter.

In addition, according to a twelfth aspect of the present invention, in the imaging system according to the fifth aspect, the control unit performs control such that the captured image is stored together with the parameters.

In addition, according to a thirteenth aspect of the present invention, in the imaging terminal according to the sixth aspect, the control unit performs control such that the captured image is stored together with the parameters.

In addition, according to a fourteenth aspect of the present invention, in the imaging terminal according to the seventh aspect, the control unit performs control such that the captured moving image is stored together with the parameters.

BRIEF DESCRIPTION OF THE DRAWINGS

FIG. 14 is a schematic diagram showing an example of Advertising data (AdvData) in the second embodiment of the present invention.

FIG. 15 is a schematic diagram showing an example in which Advertising data (AdvData) in the second embodiment of the present invention includes a packet number.

DETAILED DESCRIPTION OF THE INVENTION

First Embodiment

Figure 1:
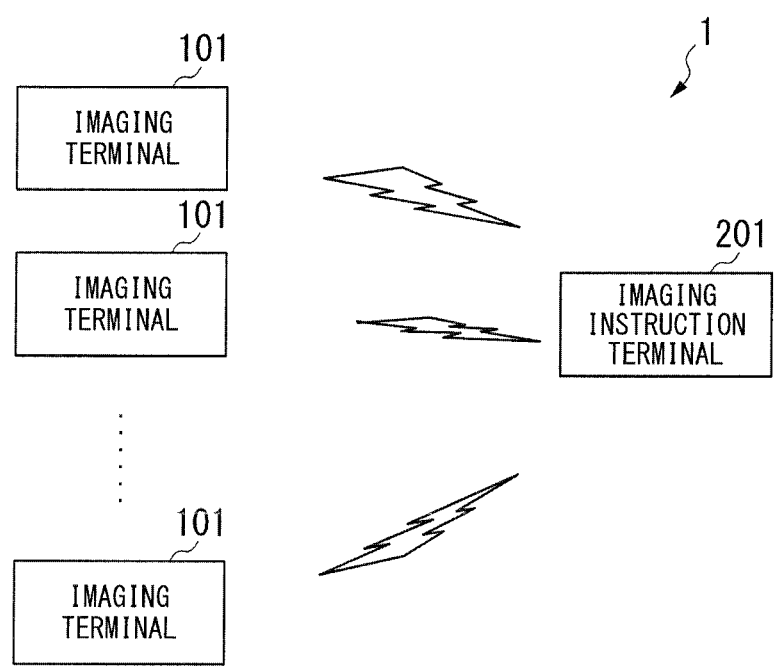
FIG. 1 is a schematic diagram showing a configuration of an imaging system according to a first embodiment of the present invention.

Hereinafter, a first embodiment of the present invention will be described with reference to drawings. An imaging system according to this embodiment includes an imaging terminal and an imaging instruction terminal. FIG. 1 is a schematic diagram showing a configuration of an imaging system according to this embodiment. In the shown example, an imaging system 1 includes a plurality of imaging terminals 101 and an imaging instruction terminal 201. For example, the imaging terminal 101 is an electronic device such as a digital camera capable of capturing an image. Also, for example, the imaging instruction terminal 201 is an electronic device such as a smartphone or a tablet capable of executing a program The imaging instruction terminal 201 simultaneously transmits an imaging instruction to the plurality of imaging terminals 101. The plurality of imaging terminals 101 capture images based on the instruction of the imaging instruction terminal 201. Therefore, the imaging instruction terminal 201 can cause the plurality of imaging terminals 101 to capture images at the same time.

Figure 2:
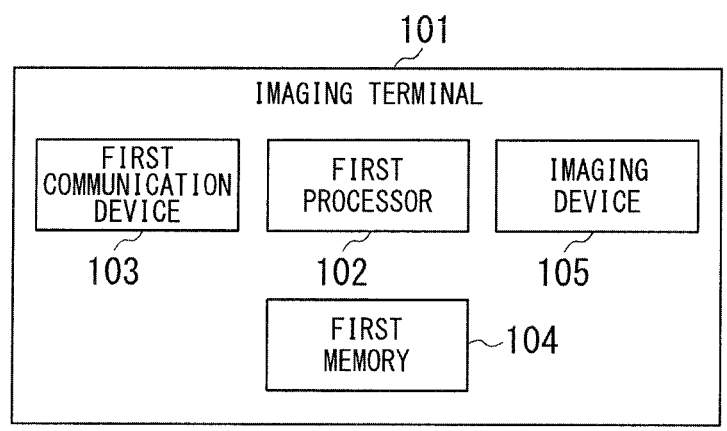
FIG. 2 is a block diagram showing a configuration of an imaging terminal according to the first embodiment of the present invention.

FIG. 2 is a block diagram showing a configuration of the imaging terminal 101 according to this embodiment. In the shown example, the imaging terminal 101 includes a first processor 102, a first communication device 103, a first memory 104, and an imaging device 105.

The first communication device 103 is a communication module that performs data communication based on a communication protocol of Bluetooth (registered trademark) or the like according to an instruction of the first processor 102. The first memory 104 stores a control program for controlling operations of components included in the imaging terminal 101 in an integrated manner and data that is exchanged by the first communication device 103. In addition, the first memory 104 temporarily stores image data and the like.

In addition, the first memory 104 includes a RAM, a flash memory, and a storage medium such as a memory card that is an external storage medium, and in which various types of data are read and written according to usage purposes.

The first processor 102 executes the control program stored in the first memory 104 and therefore performs control to image a subject according to an imaging instruction that is received from the imaging instruction terminal through the first communication device 103. In addition, the first processor 102 controls operations of components (including, for example, a display device and a manipulation unit which are not shown) included in the imaging terminal 101 in an integrated manner.

The imaging device 105 images a subject and generates an imaging signal according to an instruction of the first processor 102 and creates image data by performing various types of image processing. The created image data is recorded in a memory card (not shown) or the like.

Figure 3:
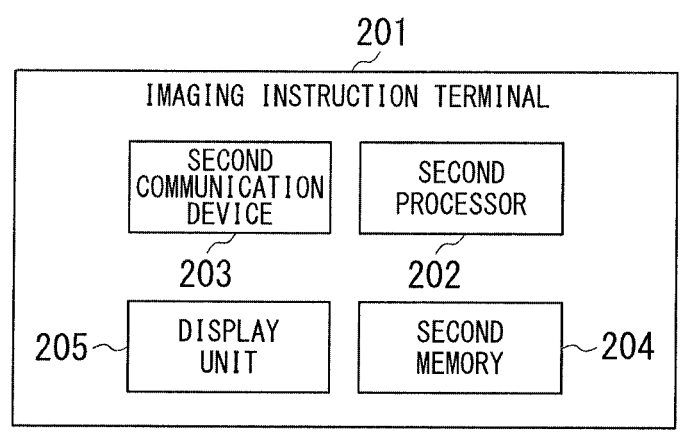
FIG. 3 is a block diagram showing a configuration of an imaging instruction terminal according to the first embodiment of the present invention.

FIG. 3 is a block diagram showing a configuration of the imaging instruction terminal 201 in this embodiment. In the shown example, the imaging instruction terminal 201 includes a second processor 202, a second communication device 203, a second memory 204, and a display unit 205.

The second communication device 203 is a communication module that performs data communication based on a communication protocol of Bluetooth or the like according to an instruction of the second processor 202. The second memory 204 stores a control program for controlling operations of components included in the imaging instruction terminal 201 in an integrated manner and data that is exchanged by the second communication device 203. In addition, the second memory 204 includes a RAM, a flash memory, and a storage medium such as a memory card that is an external storage medium, and in which various types of data are read and written according to usage purposes.

The second processor 202 executes the control program stored in the second memory 204 and therefore performs control such that an imaging instruction input through a manipulation unit (not shown) by a user is transmitted to the imaging terminal 101 through the second communication device 203. In addition, the second processor 202 controls operations of components (for example, the display unit 205 and a manipulation unit (not shown)) included in the imaging instruction terminal 201 in an integrated manner. The display unit 205 is, for example, a liquid crystal display, and displays an image and the like.

Figure 4:
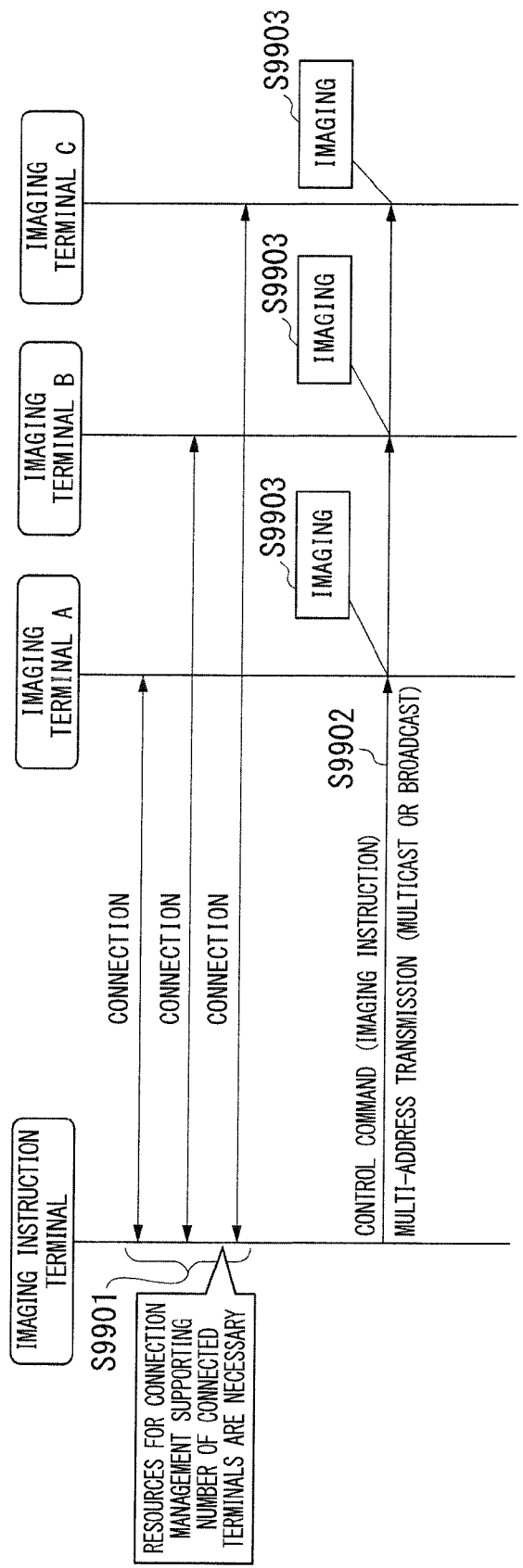
FIG. 4 is a sequence diagram showing procedures of transmitting an imaging instruction from an imaging instruction terminal to imaging terminals, which are known in the related art.

Next, an example in which an imaging instruction is transmitted from an imaging instruction terminal to imaging terminals will be described. FIG. 4 is a sequence diagram showing procedures of transmitting an imaging instruction from an imaging instruction terminal to imaging terminals, which are known in the related art.

(Step S9901)

The imaging instruction terminal establishes a communication connection with imaging terminals A to C. When data is generally transmitted and received between terminals, it is necessary to establish a connection between terminals (the connection here refers to a connection through wireless communication via a wireless LAN, Bluetooth or the like). Note that, in order to establish a connection for each terminal, resources (memories) for connection management are necessary, and when the number of imaging terminals increases, a connection failure may occur due to insufficient resources.

(Step S9902)

The imaging instruction terminal transmits a control command (an imaging instruction) to imaging terminals A to C in a multi-address transmission manner (multicast or broadcast). In the shown example, the control command (the imaging instruction) has arrived at all of the imaging terminals A to C.

(Step S9903)

When the control command (the imaging instruction) has arrived, the imaging terminals A to C perform imaging based on the control command (the imaging instruction).

Figure 5:
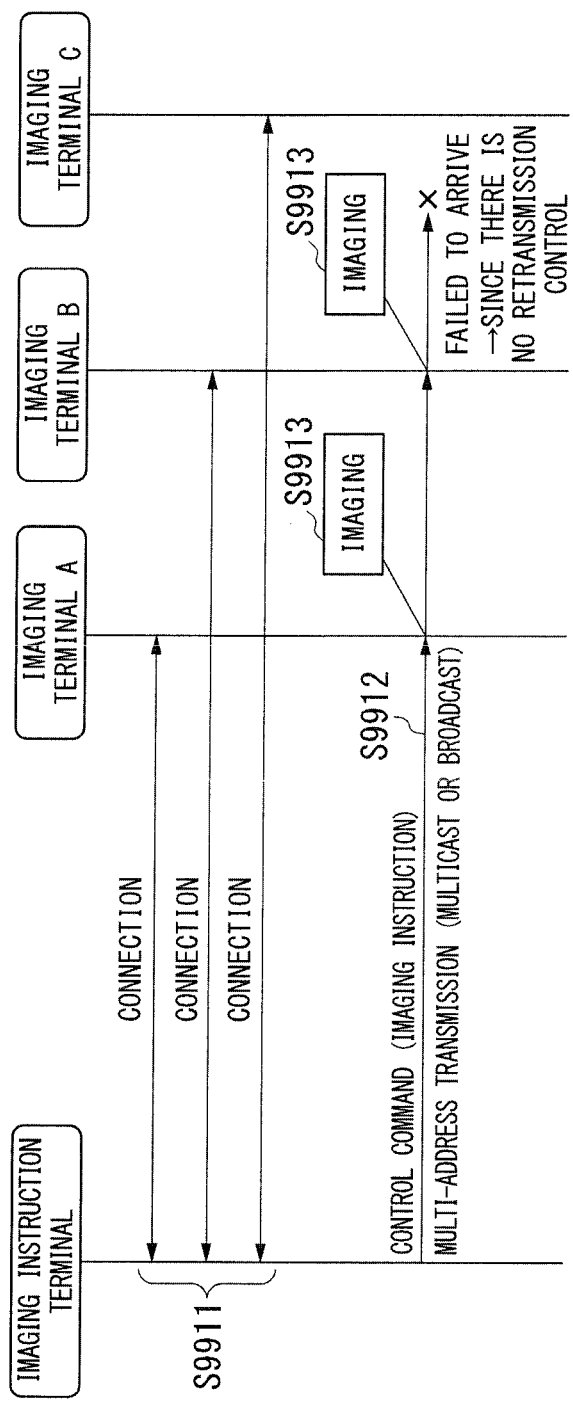
FIG. 5 is a sequence diagram showing procedures of transmitting an imaging instruction from an imaging instruction terminal to imaging terminals, which are known in the related art.

The control command (the imaging instruction) may not arrive at the imaging terminals A to C from the imaging instruction terminal due to a communication error or the like. FIG. 5 is a sequence diagram showing procedures of transmitting an imaging instruction from an imaging instruction terminal to imaging terminals, which are known in the related art. Step S9911 is similar to Step S9901.

(Step S9912)

The imaging instruction terminal transmits a control command (an imaging instruction) to imaging terminals A to C in a multi-address transmission manner (multicast or broadcast). In the shown example, the control command (the imaging instruction) has arrived at the imaging terminals A and B, but the control command (the imaging instruction) has not arrived at the imaging terminal C.

(Step S9913)

The imaging terminals A and B perform imaging based on the control command (the imaging instruction) since the control command (the imaging instruction) has arrived. On the other hand, the imaging terminal C does not perform imaging since the control command (the imaging instruction) has not arrived.

In this manner, in the method known in the related art, when a control command (an imaging instruction) is transmitted to a plurality of imaging terminals at the same time, transmission is performed in a multi-address transmission manner (multicast or broadcast). However, since retransmission control is not provided in a multi-address transmission manner, when a control command (an imaging instruction) has not arrived at an imaging terminal, the imaging terminal is not able to perform imaging.

Therefore, in this embodiment, the imaging instruction terminal 201 repeatedly transmits an imaging instruction to the imaging terminal 101 for a specified duration. Hereinafter, a communication scheme used in this embodiment will be described. In embodiments described below, a wireless communication scheme is Bluetooth. In addition, as roles of terminals in Bluetooth, the imaging terminal 101 serves as a role of Central and the imaging instruction terminal 201 serves as a role of Peripheral. Also, an Advertising packet of Bluetooth is used for multi-address transmission. In addition, an Advertising packet is transmitted from Peripheral to Central in a multi-address transmission manner before a connection is established between terminals. In addition, in this embodiment, the imaging instruction terminal 201 sends an instruction to the imaging terminal 101 by adding a control command (for example, an imaging instruction) to an Advertising packet.

Figure 6:
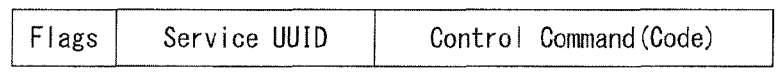
FIG. 6 is a schematic diagram showing a first example of Advertising data (AdvData) in the first embodiment of the present invention.

Next, Advertising data (AdvData) of an Advertising packet will be described. FIG. 6 is a schematic diagram showing a first example of Advertising data (AdvData) in this embodiment. In the shown example, the Advertising data (AdvData) includes "Flags," "Service UUID," and "Control Command (Code)."

"Flags" represent Flags in Bluetooth specifications and include mode information when device search (discovery) is performed. "Service UUID" represents a unique ID for identifying Service in Bluetooth specifications and is a unique ID indicating a simultaneous imaging control service in this embodiment. "Control Command (Code)" represents a control command in this embodiment and is a command code indicating, for example, "image," "start video imaging," or "stop video imaging."

In multi-address transmission, the imaging instruction terminal 201 is not able to confirm whether a control command (an imaging instruction) has arrived at the imaging terminal 101. Therefore, in this embodiment, in consideration of failure to arrive, the imaging instruction terminal 201 repeatedly transmits an Advertising packet to which a control command is added in a repeat transmission duration when one imaging instruction is transmitted. Therefore, it is possible to increase a probability of a control command (an imaging instruction) arriving at the imaging terminal 101.

Also, the imaging instruction terminal 201 repeatedly transmits an Advertising packet to which a control command is added in a repeat transmission duration when one imaging instruction is transmitted. Therefore, when an Advertising packet is repeatedly received, it is necessary for the imaging terminal 101 not to perform an imaging process redundantly. Therefore, in this embodiment, after an Advertising packet is received, even if an Advertising packet is received in the same duration as the repeat transmission duration, the imaging terminal 101 ignores a control command. Therefore, the imaging terminal 101 can prevent redundant execution of control commands that are repeatedly transmitted.

Also, the repeat transmission duration may have a predetermined duration. However, a probability of an Advertising packet not arriving may increase depending on an environment. Therefore, it is possible to increases or decreases the number of multi-address transmissions and optimally corresponds to environments by changing the repeat transmission duration to any value. For example, when a wireless communication environment is poor, the repeat transmission duration increases. Therefore, it is possible to decrease a probability of an Advertising packet not arriving.

In this case, the imaging instruction terminal 201 sets a control command and any repeat transmission duration in an Advertising packet and transmits the packet in a multi-address transmission manner. Therefore, the imaging terminal 101 refers to any repeat transmission duration set in the Advertising packet, and even if the imaging instruction terminal 201 changes the repeat transmission duration randomly, the changed repeat transmission duration can be recognized.

Figure 7:
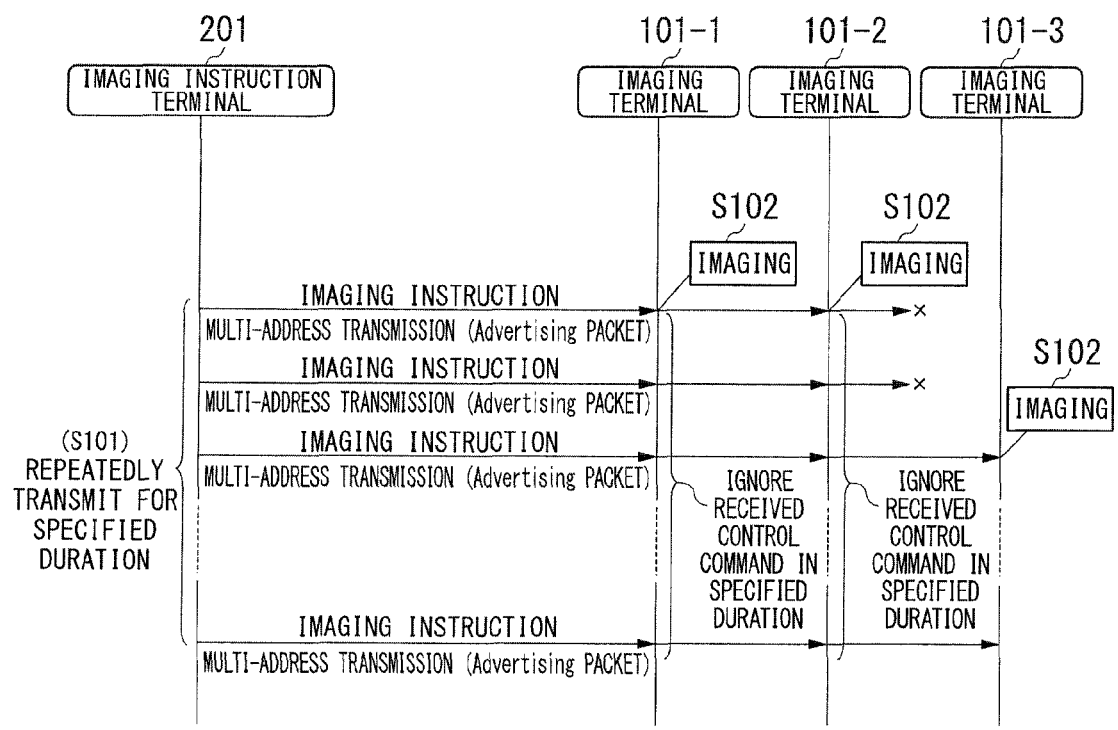
FIG. 7 is a sequence diagram showing procedures of transmitting an imaging instruction from an imaging instruction terminal to imaging terminals in the first embodiment of the present invention.

Next, an example in which an imaging instruction is transmitted from the imaging instruction terminal 201 to the imaging terminal 101 will be described. FIG. 7 is a sequence diagram showing procedures of transmitting an imaging instruction from the imaging instruction terminal 201 to the imaging terminal 101 in this embodiment.

(Step S101)

The imaging instruction terminal 201 repeatedly transmits an Advertising packet of an imaging instruction in a repeat transmission duration.

(Step S102)

The imaging terminals 101-1 and 101-2 have received an Advertising packet that is transmitted a first time and therefore perform an imaging process at a timing at which the Advertising packet is received. In addition, the imaging terminals 101-1 and 101-2 ignore a control command received in a repeat transmission duration since the Advertising packet was received. On the other hand, in the shown example, the imaging terminal 101-3 has received an Advertising packet that is transmitted a third time and therefore performs an imaging process at a timing at which the Advertising packet is received. In addition, the imaging terminal 101-3 ignores a control command received in a repeat transmission duration since the Advertising packet was received.

Figure 8:
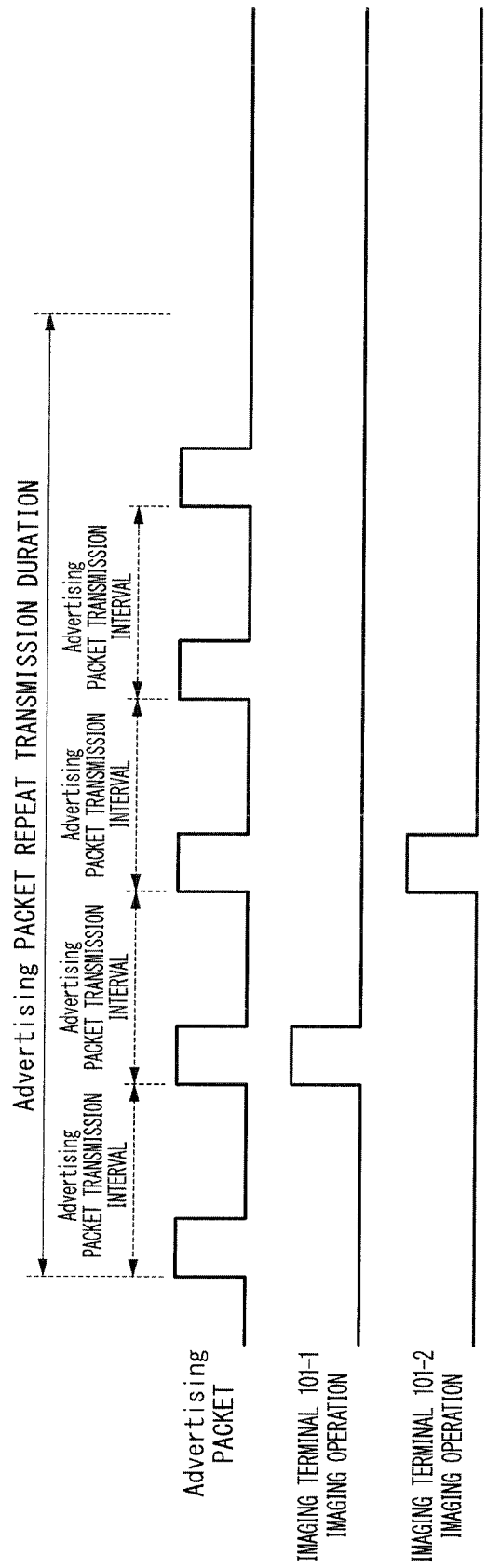
FIG. 8 is a timing chart showing timings at which imaging terminals according to the first embodiment of the present invention perform imaging.

Next, timings at which the imaging terminal 101 performs imaging will be described. FIG. 8 is a timing chart showing timings at which the imaging terminal 101 according to this embodiment performs imaging. In the shown example, the imaging instruction terminal 201 transmits an Advertising packet five times in each Advertising packet transmission interval in an Advertising packet repeat transmission duration. In addition, in the shown example, the imaging terminal 101-1 receives an Advertising packet that is transmitted a second time and performs an imaging process at a timing at which the Advertising packet is received. In addition, in the shown example, the imaging terminal 101-2 receives an Advertising packet that is transmitted a third time and performs an imaging process at a timing at which the Advertising packet is received. In this manner, the imaging terminal 101 that has received a control command (an imaging instruction) performs an imaging process.

Figure 9:
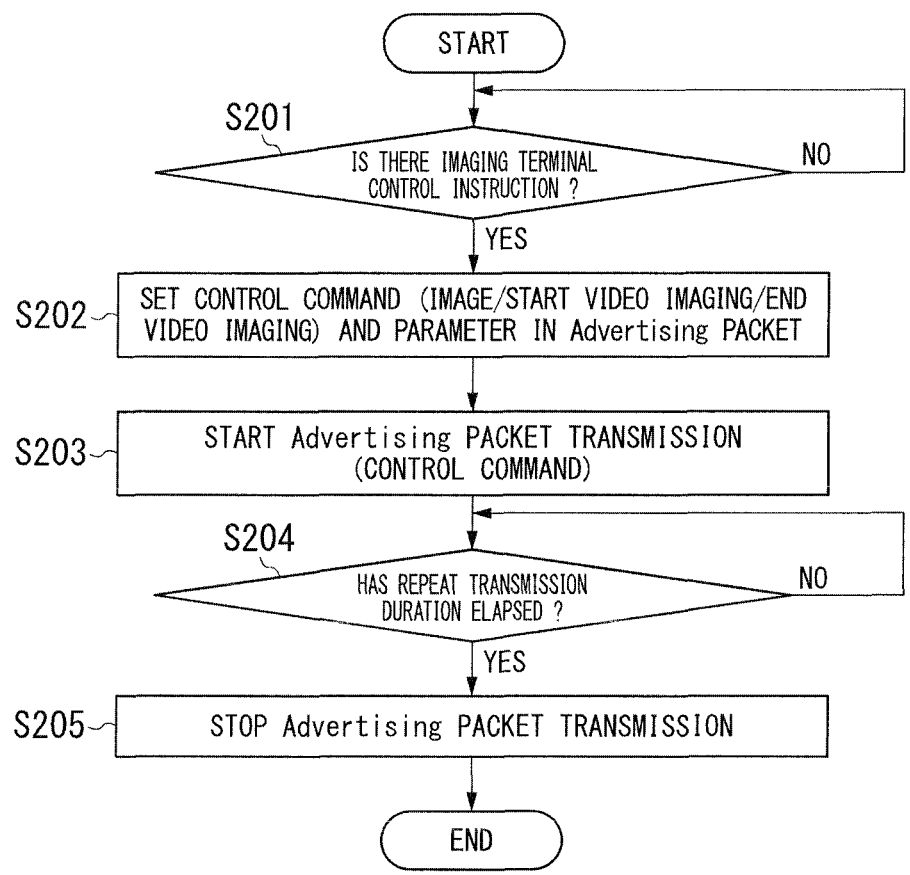
FIG. 9 is a flowchart showing operation procedures of the imaging instruction terminal in the first embodiment of the present invention.

Next, operations of the imaging instruction terminal 201 will be described. FIG. 9 is a flowchart showing operation procedures of the imaging instruction terminal 201 in this embodiment.

(Step S201)

The second processor 202 of the imaging instruction terminal 201 determines whether an imaging terminal control instruction is input. When it is determined that an imaging terminal control instruction is input, the process advances to Step S202. On the other hand, when it is determined that no imaging terminal control instruction is input, the process of Step S201 is repeated.

(Step S202)

The second processor 202 sets a control command and a parameter in an Advertising packet based on the imaging terminal control instruction that is input in the process of Step S201. Then, the process advances to Step S203. The control command includes an imaging instruction, a video imaging start instruction, a video imaging end instruction and the like.

(Step S203)

The second processor 202 causes the second communication device 203 to repeatedly transmit the Advertising packet that is set in the process of Step S202. Then, the process advances to Step S204.

(Step S204)

The second processor 202 determines whether a repeat transmission duration has elapsed. When it is determined that a repeat transmission duration has elapsed, the process advances to Step S205. On the other hand, when it is determined that a repeat transmission duration has not elapsed, the process of Step S204 is repeated.

(Step S205)

The second processor 202 causes the second communication device 203 to stop repetitive transmission of an Advertising packet. Then, the process ends.

Note that, in the above-described process, when the second processor 202 of the imaging instruction terminal 201 instructs the second communication device 203 to start transmission of an Advertising packet, a processor (not shown) in the second communication device 203 repeatedly transmits an Advertising packet until an Advertising packet transmission stop instruction is issued. However, the second processor 202 may transmit an individual Advertising packet transmission instruction to the second communication device 203 every time in a repeat transmission duration.

Figure 10:
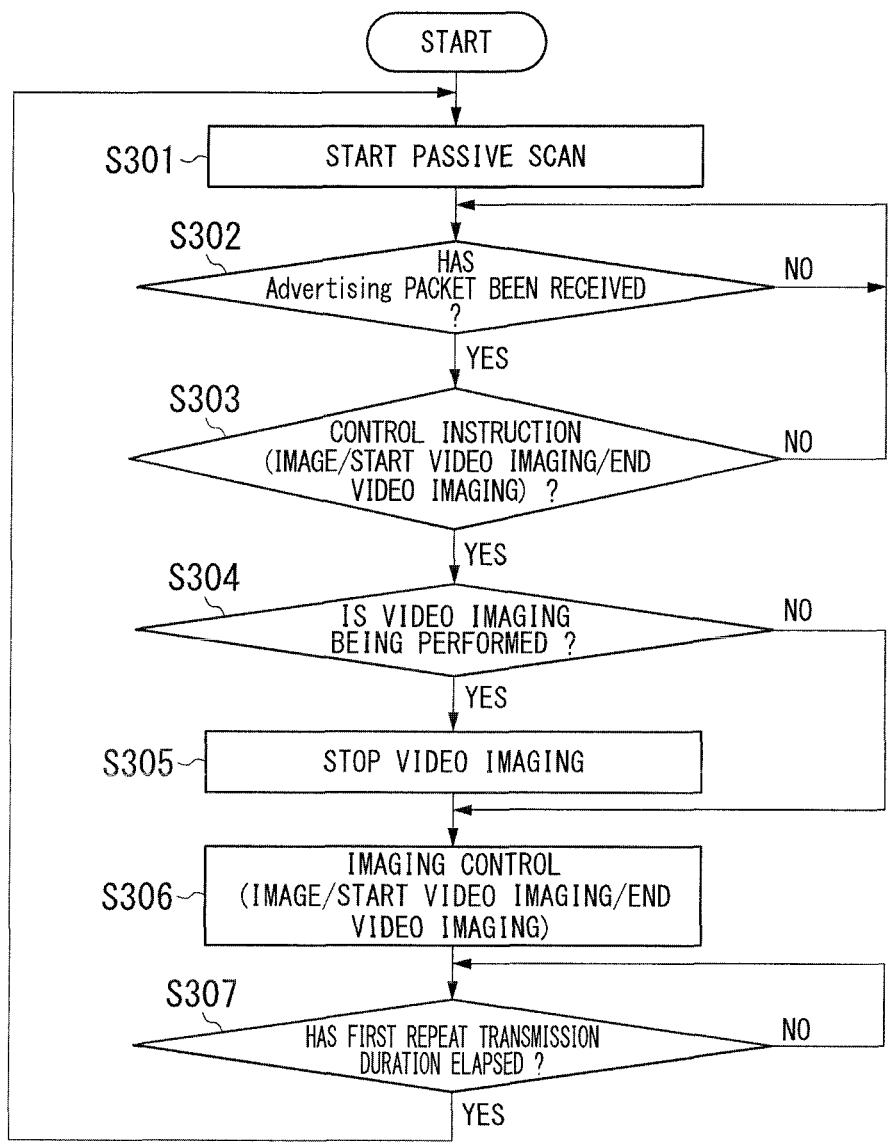
FIG. 10 is a flowchart showing operation procedures of an imaging terminal according to the first embodiment of the present invention.

Next, operations of the imaging terminal 101 will be described. FIG. 10 is a flowchart showing operation procedures of the imaging terminal 101 in this embodiment.

(Step S301)

The first processor 102 of the imaging terminal 101 starts a passive scan. Then, the process advances to Step S302.

(Step S302)

The first processor 102 determines whether an Advertising packet has been received from the imaging instruction terminal 201. When it is determined that an Advertising packet has been received, the process advances to Step S303. On the other hand, when it is determined that an Advertising packet has not been received, the process of Step S302 is repeated.

(Step S303)

The first processor 102 acquires a ServiceUUID and a control command included in the Advertising packet that is determined to have been received in the process of Step S302. When the acquired ServiceUUID is an ID indicating a simultaneous imaging control service and the control command is "image," "start video imaging," or "end video imaging," the process advances to Step S304 and otherwise, the process returns to Step S302.

(Step S304)

The first processor 102 determines whether video imaging is being performed.

When it is determined that video imaging is being performed, the process advances to Step S305. On the other hand, when it is determined that no video imaging is being performed, the process advances to Step S306.

(Step S305)

The first processor 102 stops video imaging. Then, the process advances to Step S306.

(Step S306)

The first processor 102 performs imaging control based on the control instruction that is acquired in the process of Step S303. Then, the process advances to Step S307. For example, when the control instruction acquired in the process of Step S303 is an "imaging instruction," the first processor 102 causes the imaging device 105 to capture a still image. In addition, for example, when the control instruction acquired in the process of Step S303 is "start video imaging," the first processor 102 causes the imaging device 105 to capture a moving image. In addition, for example, when the control instruction acquired in the process of Step S303 is "end video imaging," the first processor 102 causes the imaging device 105 to end capturing of a moving image.

(Step S307)

The first processor 102 determines whether a repeat transmission duration has elapsed since the Advertising packet was received in the process of Step S302. When it is determined that a repeat transmission duration has elapsed since the Advertising packet was received in the process of Step S302, the process returns to Step S301. On the other hand, when it is determined that a repeat transmission duration has not elapsed since the Advertising packet was received in the process of Step S302, the process of Step S307 is repeated.

According to the above-described process, in this embodiment, in consideration of a control command that has not arrived, when one instruction (for example, an imaging instruction, a video imaging start instruction, or a video imaging end instruction) is transmitted, the imaging instruction terminal 201 repeatedly transmits an Advertising packet to which a control command is added in a repeat transmission duration. Therefore, it is possible to increase a probability of a control command (an imaging instruction) arriving at the imaging terminal 101.

Also, according to this embodiment, the imaging instruction terminal 201 repeatedly transmits an Advertising packet to which a control command is added in a repeat transmission duration when one imaging instruction is transmitted. Therefore, it is necessary for the imaging terminal 101 not to perform a process redundantly based on the instruction when an Advertising packet is repeatedly received. Therefore, in this embodiment, after an Advertising packet is received, even if an Advertising packet is received in the same duration as the repeat transmission duration, the imaging terminal 101 ignores a control command. Therefore, the imaging terminal 101 can prevent redundant execution of control commands that are repeatedly transmitted.

Second Embodiment

Next, a second embodiment of the present invention will be described. Configurations of the imaging system 1, the imaging terminal 101, and the imaging instruction terminal 201 according to this embodiment are similar to those of the first embodiment.

Figure 11:
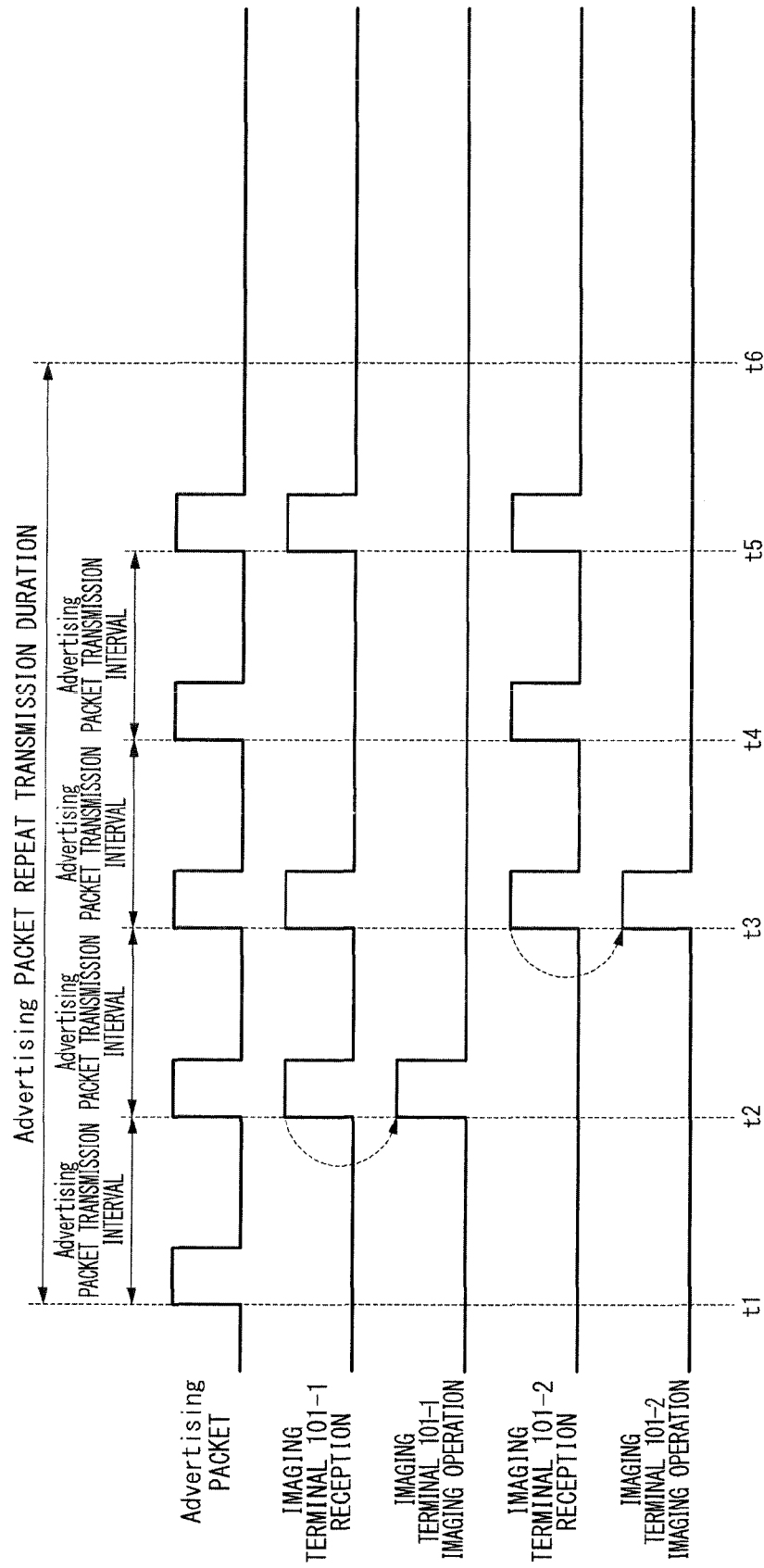
FIG. 11 is a timing chart showing timings at which the imaging terminal according to the first embodiment of the present invention performs an imaging process.

In the first embodiment, the imaging terminal 101 that has received a control command (an imaging instruction) performs an imaging process only once after the control command (the imaging instruction) has been received. FIG. 11 is a timing chart showing timings at which the imaging terminals 101 according to the first embodiment perform an imaging process.

In the shown example, the imaging instruction terminal 201 transmits an Advertising packet five times in each Advertising packet transmission interval at timings of a time t1 to a time t5 in a first repeat transmission duration of an Advertising packet (in the shown example, a duration from a time t1 to a time t6).

Also, in the shown example, the imaging terminal 101-1 receives an Advertising packet that is transmitted at a timing of a time t2 and performs an imaging process at the timing of the time t2 at which the Advertising packet is received. In addition, while the imaging terminal 101-1 also receives an Advertising packet at timings of times t3 and t5, it ignores an imaging instruction of an Advertising packet that is received in a first repeat transmission duration after the Advertising packet was initially received. Therefore, even when an Advertising packet is received a plurality of times, the imaging terminal 101-1 can perform an imaging process only once.

Also, in the shown example, the imaging terminal 101-2 receives an Advertising packet that is transmitted at a timing of a time t3 and performs an imaging process at the timing of the time t3 at which the Advertising packet is received. In addition, while the imaging terminal 101-1 also receives an Advertising packet at timings of times t4 and t5, it ignores an imaging instruction of an Advertising packet that is received in a first repeat transmission duration after the Advertising packet was initially received. Therefore, even when an Advertising packet is received a plurality of times, the imaging terminal 101-2 can perform an imaging process only once.

However, in the example shown in FIG. 11, the imaging terminal 101-1 performs imaging at a timing of a time t2 and the imaging terminal 101-2 performs imaging at a timing of a time t3.

Therefore, the imaging terminal 101-1 and the imaging terminal 101-2 have different imaging timings.

Therefore, in this embodiment, the imaging terminals 101 included in the imaging system 1 perform an imaging process so that at least one image is captured at the same timing. Specifically, in this embodiment, the imaging terminal 101 that has received a control command (an imaging instruction) repeatedly performs an imaging process according to an Advertising packet transmission interval after the control command (the imaging instruction) has been received.

Figure 12:
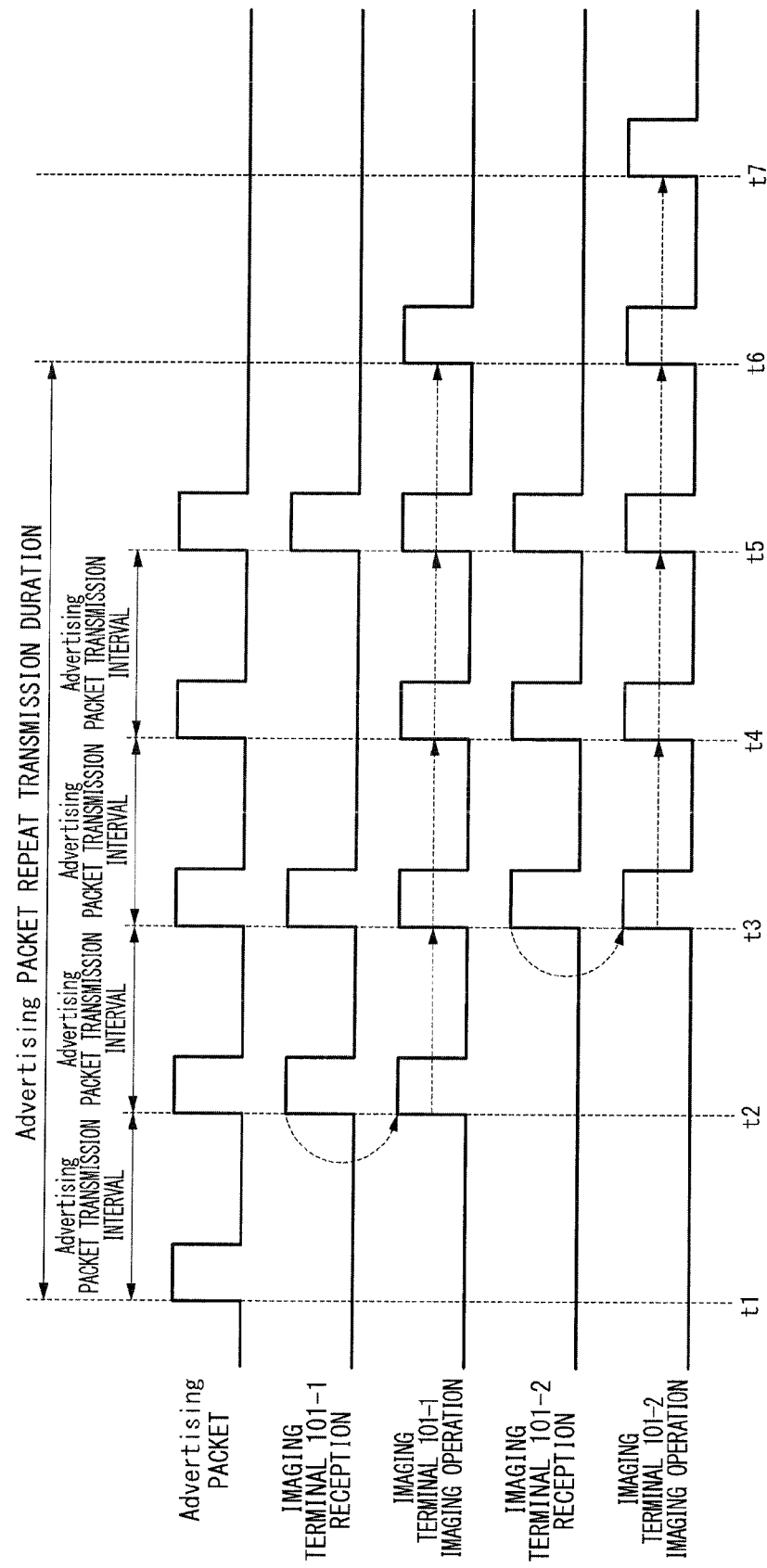
FIG. 12 is a timing chart showing timings at which imaging terminals according to a second embodiment of the present invention perform imaging a plurality of times.

FIG. 12 is a timing chart showing timings at which the imaging terminals 101 according to this embodiment perform imaging a plurality of times. In the shown example, the imaging instruction terminal 201 transmits an Advertising packet five times in each Advertising packet transmission interval at timings of a time t1 to a time t5 in a first repeat transmission duration of an Advertising packet (in the shown example, a duration from a time t1 to a time t6).

Also, in the shown example, the imaging terminal 101-1 receives an Advertising packet that is transmitted at a timing of a time t2, performs an imaging process at the timing of the time t2 at which the Advertising packet is received, and further repeatedly performs an imaging process at timings of times t3 to t6 according to an Advertising packet transmission interval in a duration from the time t2 until an Advertising packet repeat transmission duration has elapsed (in the shown example, in a duration from a time t2 to a time t7). That is, the imaging terminal 101-1 performs a series of imaging processes in which imaging is performed a plurality of times once based on the Advertising packet that is received at the time t2.

In addition, while the imaging terminal 101-1 also receives an Advertising packet at timings of times t3 and t5, it ignores an imaging instruction of an Advertising packet that is received in a first repeat transmission duration after the Advertising packet was initially received.

Therefore, even when an Advertising packet is received a plurality of times, the imaging terminal 101-1 can perform a series of imaging processes in which imaging is performed a plurality of times only once.

Also, in the shown example, the imaging terminal 101-2 receives an Advertising packet that is transmitted at a timing of a time t3, performs an imaging process at the timing of the time t3 at which the Advertising packet is received, and further repeatedly performs an imaging process at timings of times t4 to t7 according to an Advertising packet transmission interval in a duration from the time t3 until an Advertising packet repeat transmission duration has elapsed (in the shown example, in a duration from a time t3 to a time t8). That is, the imaging terminal 101-2 performs a series of imaging processes in which imaging is performed a plurality of times once based on the Advertising packet that is received at the time t3.

In addition, while the imaging terminal 101-2 also receives an Advertising packet at timings of times t4 and t5, it ignores an imaging instruction of an Advertising packet that is received in a first repeat transmission duration after the Advertising packet was initially received.

Therefore, even when an Advertising packet is received a plurality of times, the imaging terminal 101-2 can perform a series of imaging processes in which imaging is performed a plurality of times only once.

Therefore, even when timings at which an Advertising packet is received are different between the imaging terminals 101, it is possible to capture an image at the same timing. For example, in the example shown in FIG. 12, the imaging terminal 101-1 captures images at timings of a time t2 to a time t6, and the imaging terminal 101-2 captures images at timings of a time t3 to a time t7. In this manner, the imaging terminals 101-1 and 101-2 can capture at least one image at the same time.

Note that operations of the imaging instruction terminal 201 in this embodiment are similar to those of the imaging instruction terminal 201 in the first embodiment.

Figure 13:
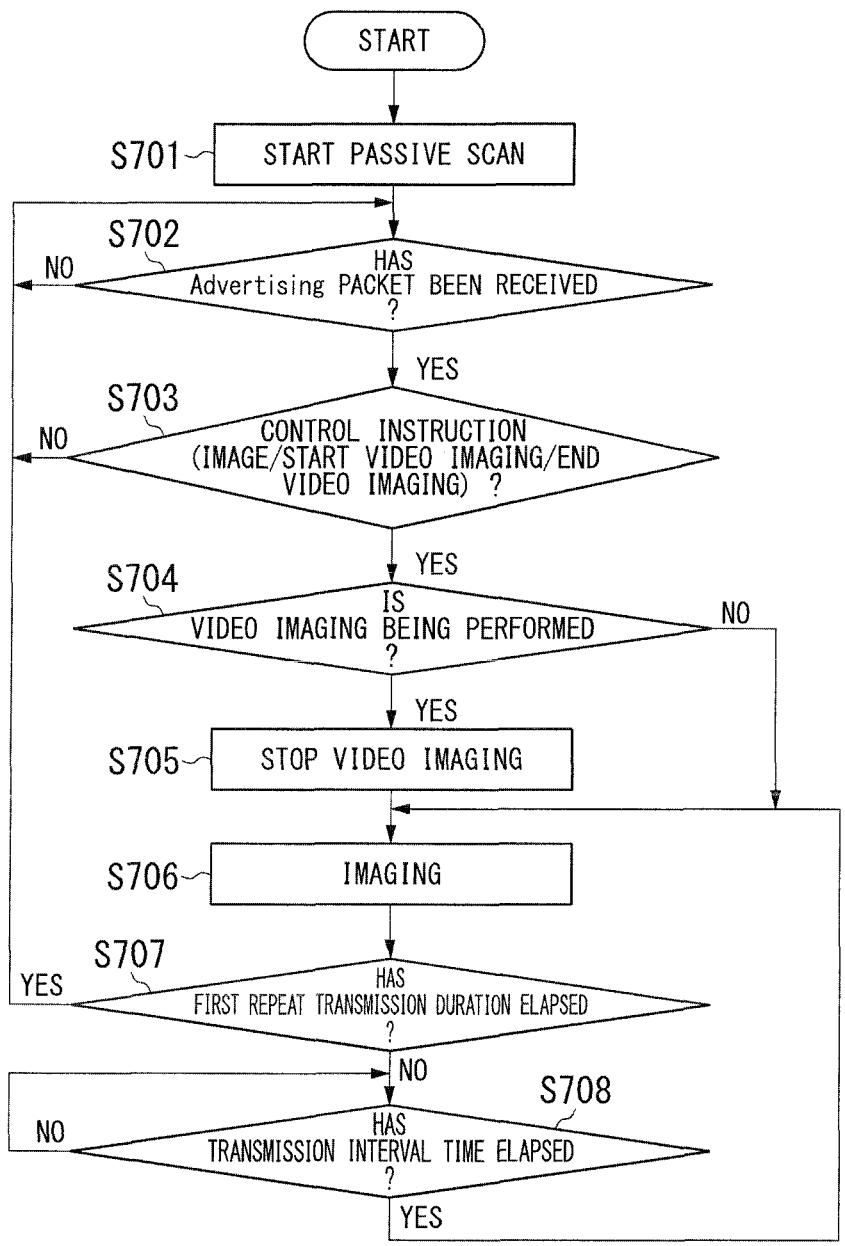
FIG. 13 is a flowchart showing operation procedures of an imaging terminal according to the second embodiment of the present invention.

Next, operations of the imaging terminal 101 according to this embodiment will be described. FIG. 13 is a flowchart showing operation procedures of the imaging terminal 101 according to this embodiment. Processes of Steps S701 to S706 are similar to the processes of Steps S301 to S306 in FIG. 10.

(Step S707)

The first processor 102 determines whether a first repeat transmission duration has elapsed since the Advertising packet was received in the process of Step S702. When it is determined that a first repeat transmission duration has not elapsed since the Advertising packet was received in the process of Step S702, the process advances to Step S708. On the other hand, when it is determined that a first repeat transmission duration has elapsed since the Advertising packet was received in the process of Step S702, the process returns to Step S702.

(Step S708)

The first processor 102 determines whether an Advertising packet transmission interval time has elapsed since imaging control was performed in the process of Step S706. When it is determined that an Advertising packet transmission interval time has elapsed since imaging control was performed in the process of Step S706, the process returns to Step S706. On the other hand, when it is determined that an Advertising packet transmission interval time has not elapsed since imaging control was performed in the process of Step S706, the process of Step S708 is repeated.

Also, in the above-described example, when an Advertising packet transmission interval is predetermined, the imaging terminal 101 repeatedly performs an imaging process based on a predetermined repeat transmission duration and transmission interval.

Also, the repeat transmission duration and the transmission interval may have a predetermined value. However, since a probability of an Advertising packet not arriving increases depending on environments, it is possible to correspond to the environment by changing the repeat transmission duration and the transmission interval to any value and increasing or decreasing the number of multi-address transmissions. For example, when a wireless communication environment is poor, it is possible to increase the number of Advertising packet transmissions and decrease a probability of an Advertising packet not arriving by increasing the repeat transmission duration and decreasing the transmission interval.

In this case, the imaging instruction terminal 201 sets a control command, any repeat transmission duration, and any transmission interval in an Advertising packet as parameters and transmits the packet in a multi-address transmission manner. Therefore, the imaging terminal 101 refers to any repeat transmission duration and any transmission interval set in the Advertising packet, and even if the imaging instruction terminal 201 changes the repeat transmission duration and the transmission interval randomly, the changed repeat transmission duration and transmission interval can be recognized.

FIG. 14 is a schematic diagram showing an example of Advertising data (AdvData) in this embodiment. In the shown example, Advertising data (AdvData) includes "Flags," "Service UUID," and "Control Command."

"Flags" and "Service UUID" are similar to those in the example shown in FIG. 6. "Control Command" includes "Code," "Duration," and "Interval." "Code" is similar to "Control Command (Code)" shown in FIG. 6. "Duration" represents an Advertising packet repeat transmission duration. "Interval" represents an Advertising packet transmission interval.

Therefore, the imaging terminal 101 refers to any repeat transmission duration and any transmission interval set in an Advertising packet, and even if the imaging instruction terminal 201 changes the repeat transmission duration and the transmission interval randomly, the changed repeat transmission duration and transmission interval can be recognized. Therefore, the imaging terminals 101 can capture images at the same timing even if timings at which an Advertising packet is received are different.

Also, "Duration" may be replaced with "Total Tx Number." "Total Tx Number" represents a total number of transmissions. In this case, an "Advertising packet repeat transmission duration" can be calculated by dividing a "first repeat transmission duration (Advertising packet repeat transmission duration)" by a "total number of transmissions."

Furthermore, the imaging instruction terminal 201 may include a packet number in Advertising data (AdvData), and add a packet number to each Advertising packet that is transmitted. FIG. 15 is a schematic diagram showing an example in which Advertising data (AdvData) in this embodiment includes a packet number. In the shown example, Advertising data (AdvData) includes "Flags," "Service UUID," and "Control Command."

"Flags" and "Service UUID" are similar to those in the example shown in FIG. 6. "Control Command" includes "Code," "Duration," "Interval," and "Packet No." "Code," "Duration," and "Interval" are similar to those in the example shown in FIG. 14. "Packet No." represents a packet number for identifying individual packets. The packet number is incremented whenever one packet is transmitted using, for example, a packet number (for example, 0, 1, or 10) of an Advertising packet that is initially transmitted as a starting point.

In this case, the imaging terminal 101 increments a packet number whenever imaging is performed using a packet number of an Advertising packet that is initially received as a starting point and stores it in association with image data.

In this manner, the imaging instruction terminal 201 adds a packet number to each Advertising packet that is transmitted. In addition, the imaging terminal 101 increments a packet number whenever imaging is performed using a packet number of an Advertising packet that is initially received as a starting point and stores it in association with image data. Therefore, within image data captured by the imaging terminals 101, data having the same packet number can be collected as image data that is captured at the same timing. In this method, there is no need to adjust times of the plurality of imaging terminals 101, unlike in a method of collecting time stamps of image data known in the related art.

For example, in the example shown in FIG. 12, the imaging instruction terminal 201 adds number 10 to an Advertising packet that is transmitted at a time t1, adds number 11 to an Advertising packet that is transmitted at a time t2, adds number 13 to an Advertising packet that is transmitted at a time t3, adds number 14 to an Advertising packet that is transmitted at a time t4, and adds number 15 to an Advertising packet that is transmitted at a time t5.

In this case, since the imaging terminal 101-1 has received an Advertising packet at the time t2, it adds number 12 that is added to the Advertising packet to an image captured at the time t2. Therefore, the imaging terminal 101-1 adds number 13 to an image captured at the time t3, adds number 14 to an image captured at the time t4, adds number 15 to an image captured at the time t5, and adds number 16 to an image captured at the time t6.

In addition, since the imaging terminal 101-2 has received an Advertising packet at the time t3, it adds number 13 that is added to the Advertising packet to an image captured at the time t3. Therefore, the imaging terminal 101-2 adds number 14 to an image captured at the time t4, adds number 15 to an image captured at the time t5, adds number 16 to an image captured at the time t6, and adds number 17 to an image captured at a time t7.

Therefore, it is possible to easily assess that an image of number 13 captured by the imaging terminal 101-1 and an image of number 13 captured by the imaging terminal 101-2 are captured at the same timing. In addition, it is possible to easily assess that an image of number 14 captured by the imaging terminal 101-1 and an image of number 14 captured by the imaging terminal 101-2 are captured at the same timing. In addition, it is possible to easily assess that an image of number 15 captured by the imaging terminal 101-1 and an image of number 15 captured by the imaging terminal 101-2 are captured at the same timing. In addition, it is possible to easily assess that an image of number 16 captured by the imaging terminal 101-1 and an image of number 16 captured by the imaging terminal 101-2 are captured at the same timing.

Also, the imaging terminal 101 may store captured image data and various parameters included in Advertising data in association. Therefore, it is possible to confirm image data, an Advertising packet repeat transmission duration, and an Advertising packet transmission interval in combination.

In addition, similarly to a case in which a moving image is captured, the same number may be added to moving images captured at the same timing. Specifically, the imaging terminal 101 that has received a control command (a video imaging start instruction) divides a moving image into a plurality of chapters according to the Advertising packet transmission interval after the control command (the video imaging start instruction) is received. Then, the imaging terminal 101 increments a packet number for each chapter using a packet number of an Advertising packet that is initially received as a starting point, and superimposes and stores (associates) it as an index for each chapter of a moving image. Therefore, within moving image data captured by the imaging terminals 101, data having the same packet number can be collected as moving image data captured at the same timing.

Figure 16:
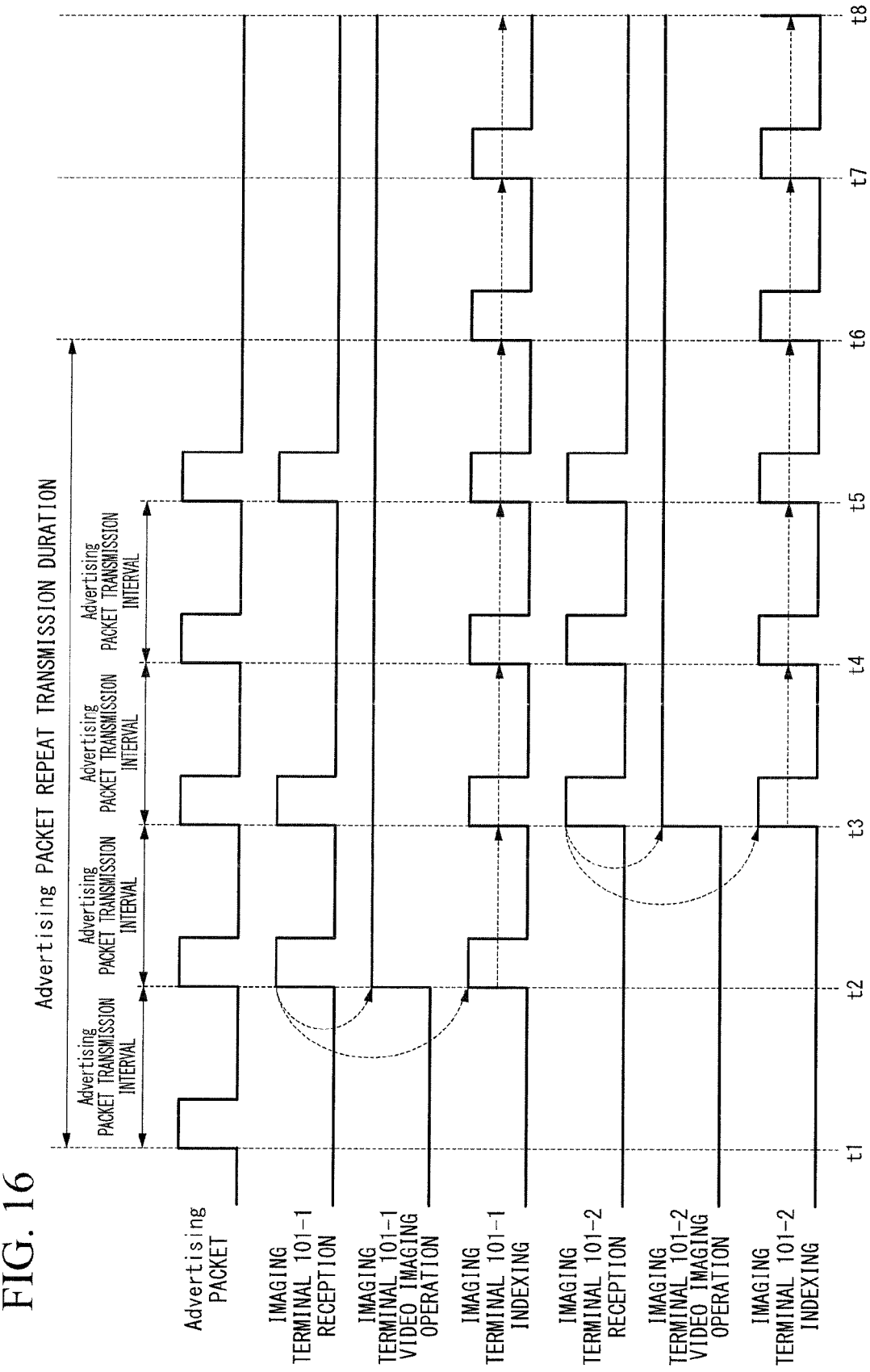
FIG. 16 is a timing chart showing an example in which imaging terminals according to the second embodiment of the present invention add an index for each chapter of a moving image.

FIG. 16 is a timing chart showing an example in which the imaging terminals 101 according to this embodiment add an index for each chapter of a moving image. In the shown example, the imaging instruction terminal 201 transmits an Advertising packet five times in each Advertising packet transmission interval at timings of a time t1 to a time t5 in a first repeat transmission duration of an Advertising packet (in the shown example, a duration from a time t1 to a time t6).

At this time, the imaging instruction terminal 201 adds number 10 to an Advertising packet that is transmitted at a time t1, adds number 11 to an Advertising packet that is transmitted at a time t2, adds number 13 to an Advertising packet that is transmitted at a time t3, adds number 14 to an Advertising packet that is transmitted at a time t4, and adds number 15 to an Advertising packet that is transmitted at a time t5.

In addition, in the shown example, the imaging terminal 101-1 receives the Advertising packet that is transmitted at the timing of the time t2, starts capturing of a moving image at the timing of the time t2 at which the Advertising packet is received, and further adds an index according to an Advertising packet transmission interval.

In this case, since the imaging terminal 101-1 has received an Advertising packet at the time t2, it uses a moving image captured from the time t2 to the time t3 as one chapter and adds number 12 that is added to the Advertising packet as an index of the chapter. Then, the imaging terminal 101-1 uses a moving image captured from the time t3 to the time t4 as one chapter and adds the incremented number 13 as an index of the chapter, uses a moving image captured from the time t4 to the time t5 as one chapter and adds the incremented number 14 as an index of the chapter, uses a moving image captured from the time t5 to time t6 as one chapter and adds the incremented number 15 as an index of the chapter, and uses a moving image captured from the time t6 to the time t7 as one chapter and adds the incremented number 16 as an index of the chapter. Similarly to times after the time t7, the imaging terminal 101-1 adds an incremented number as an index of a chapter until capturing of a moving image ends.

Also, in this case, since the imaging terminal 101-2 has received an Advertising packet at the time t3, it uses a moving image captured from the time t3 to the time t4 as one chapter and adds number 13 that is added to the Advertising packet as an index of the chapter. Then, the imaging terminal 101-1 uses a moving image captured from the time t4 to the time t5 as one chapter and adds the incremented number 14 as an index of the chapter, uses a moving image captured from the time t5 to the time t6 as one chapter and adds the incremented number 15 as an index of the chapter, uses a moving image captured from the time t6 to the time t7 as one chapter and adds the incremented number 16 as an index of the chapter, and uses a moving image captured from the time t7 to the time t8 as one chapter and adds the incremented number 17 as an index of the chapter. Similarly to times after the time t8, the imaging terminal 101-1 adds an incremented number as an index of a chapter until capturing of a moving image ends.

In addition, while the imaging terminal 101-1 also receives an Advertising packet at timings of times t3 and t5, it ignores an imaging instruction of an Advertising packet that is received in a first repeat transmission duration after the Advertising packet was initially received.

Therefore, even when an Advertising packet is received a plurality of times, the imaging terminal 101-1 can start capturing of a moving image only once.

In addition, while the imaging terminal 101-2 also receives an Advertising packet at timings of times t4 and t5, it ignores an imaging instruction of an Advertising packet that is received in a first repeat transmission duration after the Advertising packet was initially received.

Therefore, even when an Advertising packet is received a plurality of times, the imaging terminal 101-2 can start capturing of a moving image only once.

Therefore, even when timings at which an Advertising packet is received are different between the imaging terminals 101, it is possible to add an index at the same timing. For example, in the example shown in FIG. 16, the imaging terminal 101-1 uses a time t2 as a starting point and adds an incremented index according to an Advertising packet transmission interval. In addition, the imaging terminal 101-2 uses a time t3 as a starting point and adds an incremented index according to an Advertising packet transmission interval. In this manner, the imaging terminals 101-1 and 101-2 can add an index at the same timing at least once. In addition, it is easy to specify a video connection point when a single video is created from a plurality of pieces of moving image data using this index.

In addition, the imaging terminal 101 may store captured moving image data and various parameters included in Advertising data in association. Therefore, it is possible to confirm moving image data, an Advertising packet repeat transmission duration, and an Advertising packet transmission interval in combination.

Third Embodiment

Next, a third embodiment of the present invention will be described. Configurations of the imaging system 1, the imaging terminal 101, and the imaging instruction terminal 201 according to this embodiment are similar to those of the first embodiment.

Figure 17:
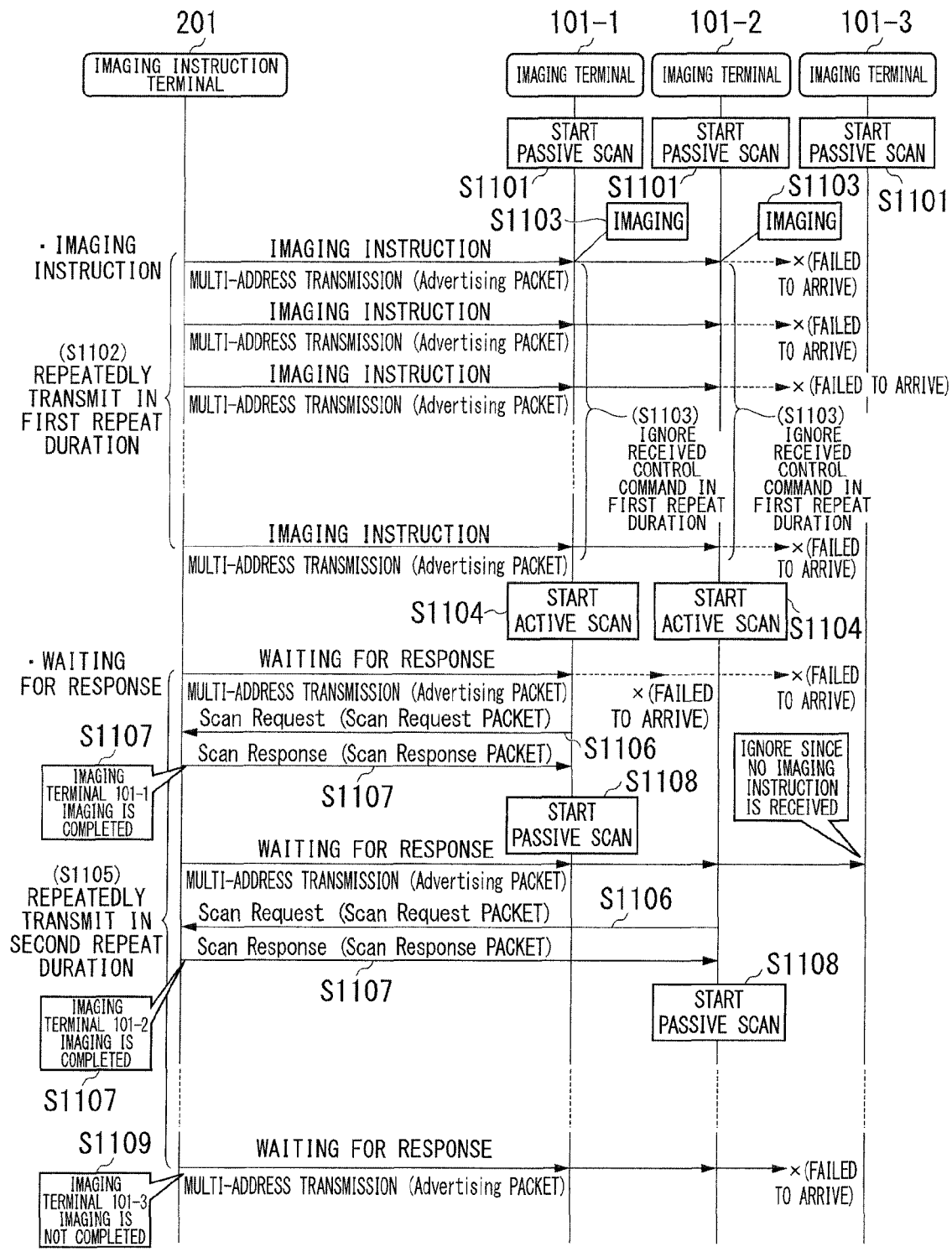
FIG. 17 is a sequence diagram showing procedures of transmitting an imaging instruction from an imaging instruction terminal in a third embodiment of the present invention to imaging terminals and confirming delivery of the imaging instruction.

In this embodiment, an active scan is used to confirm whether an imaging instruction is delivered to the imaging terminal 101 from the imaging instruction terminal 201. FIG. 17 is a sequence diagram showing procedures of transmitting an imaging instruction from the imaging instruction terminal 201 to the imaging terminal 101 in this embodiment and confirming delivery of the imaging instruction.

(Step S1101)

The imaging terminals 101-1 to 101-3 start a passive scan. The passive scan is a scanning method in which an Advertising packet is received only and no response is returned.

(Step S1102)

The imaging instruction terminal 201 repeatedly transmits an Advertising packet of an imaging instruction in a first repeat transmission duration. In addition, when the first repeat transmission duration ends, the imaging instruction terminal 201 ends repetitive transmission of an Advertising packet of an imaging instruction.

(Step S1103)

The imaging terminals 101-1 and 101-2 have received an Advertising packet and therefore perform an imaging process at a timing at which the Advertising packet is received. In addition, the imaging terminals 101-1 and 101-2 ignore a received control command in a first repeat transmission duration after the Advertising packet was received. On the other hand, in the shown example, no Advertising packet has arrived at the imaging terminal 101-3. Therefore, the imaging terminal 101-3 does not perform a process because no Advertising packet has been received.

(Step S1104)

The imaging terminals 101-1 and 101-2 start an active scan since the first repeat transmission duration has elapsed since the Advertising packet was received. The active scan is a scanning method in which a response (Scan Request) is returned when an Advertising packet is received. Also, the imaging terminal 101-3 does not perform a process because no Advertising packet has been received.

(Step S1105)

The imaging instruction terminal 201 repeatedly transmits an Advertising packet waiting for response in a multi-address transmission manner in a second repeat transmission duration in order to confirm delivery after the first repeat transmission duration has elapsed. In addition, the imaging instruction terminal 201 ends repetitive transmission of an Advertising packet waiting for response after the second repeat transmission duration has elapsed.

(Step S1106)

The imaging terminals 101-1 and 101-2 are in an active scan. Therefore, the imaging terminals 101-1 and 101-2 transmit a Scan Request packet of a scan request when an Advertising packet waiting for response is received. On the other hand, the imaging terminal 101-3 is in a passive scan. Therefore, the imaging terminal 101-3 does not perform a process even when an Advertising packet waiting for response is received. In the shown example, the imaging terminal 101-1 receives an Advertising packet waiting for response that is transmitted a first time. In addition, the imaging terminal 101-2 receives an Advertising packet waiting for response that is transmitted a second time.

(Step S1107)

When a Scan Request packet of a scan request is received, the imaging instruction terminal 201 determines that imaging performed by the imaging terminal 101 that has transmitted the Scan Request packet of the scan request is completed. In the shown example, the imaging instruction terminal 201 determines that imaging performed by the imaging terminals 101-1 and 101-2 is completed. In addition, when a Scan Request packet of a scan request is received, the imaging instruction terminal 201 transmits a Scan Response packet of a scan response to the imaging terminal 101 that has transmitted the Scan Request packet of the scan request. In the shown example, the imaging instruction terminal 201 transmits a Scan Response packet of a scan response to the imaging terminals 101-1 and 101-2.

(Step S1108)

The imaging terminals 101-1 and 101-2 start a passive scan when a Scan Response packet of a scan response is received. Therefore, even when an Advertising packet waiting for response is received a plurality of times, it is possible to ignore an Advertising packet waiting for response that is received a second time and thereafter.

(Step S1109)

The imaging instruction terminal 201 determines that imaging performed by the imaging terminal 101 that has not received a Scan Request packet of a scan request at a time point at which repetitive transmission of an Advertising packet waiting for response ends is not completed. In the shown example, the imaging instruction terminal 201 determines that imaging performed by the imaging terminal 101-3 is not completed.

Figure 18:
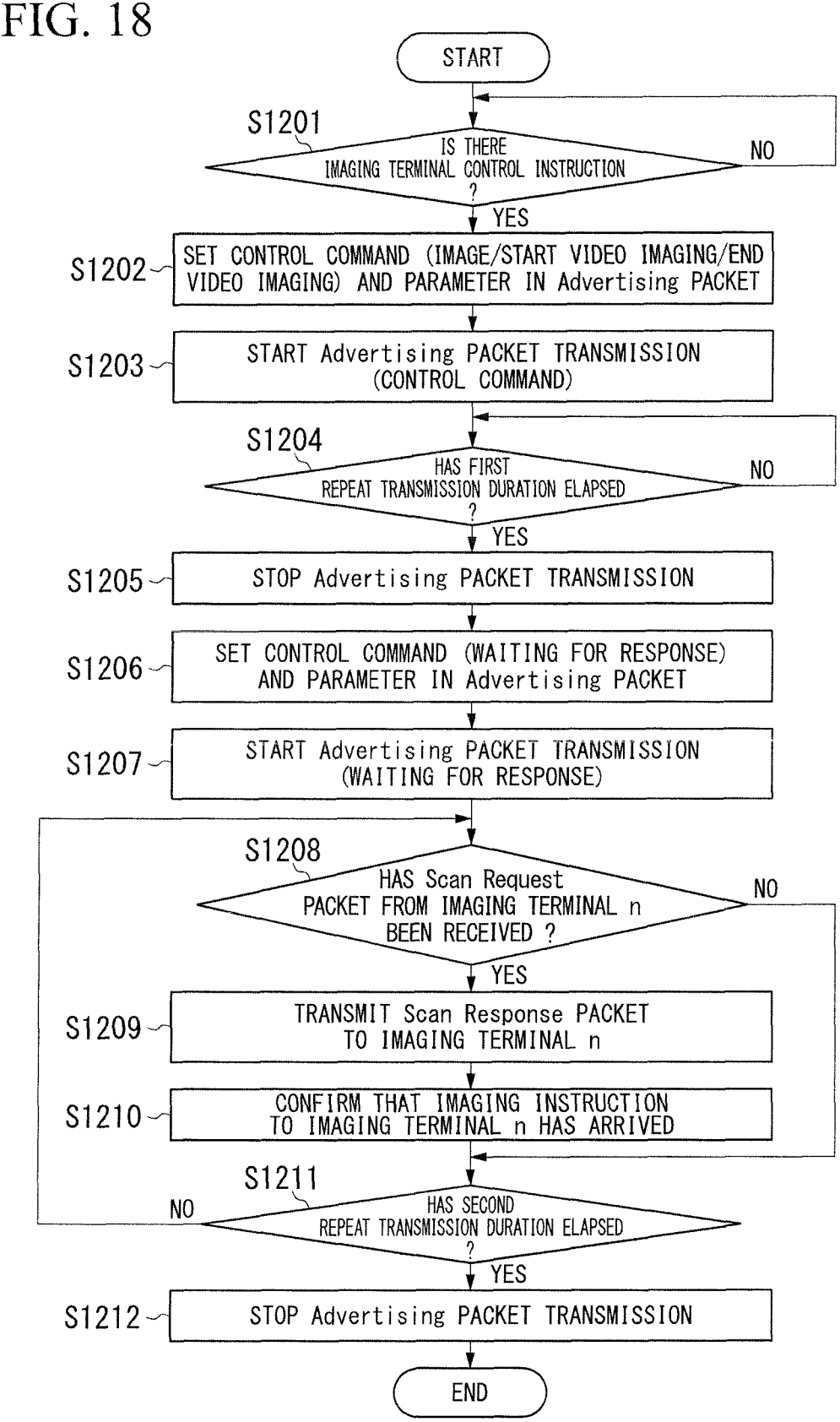
FIG. 18 is a flowchart showing operation procedures of the imaging instruction terminal in the third embodiment of the present invention.

Next, operations of the imaging instruction terminal 201 will be described. FIG. 18 is a flowchart showing operation procedures of the imaging instruction terminal 201 in this embodiment.

(Step S1201)

The second processor 202 of the imaging instruction terminal 201 determines whether an imaging terminal control instruction is input. When it is determined that an imaging terminal control instruction is input, the process advances to Step S1202. On the other hand, when it is determined that no imaging terminal control instruction is input, the process of Step S1201 is repeated.

(Step S1202)

The second processor 202 sets a control command and a parameter in an Advertising packet based on the imaging terminal control instruction that is input in the process of Step S201. Then, the process advances to Step S1203. The control command includes an imaging instruction, a video imaging start instruction, a video imaging end instruction and the like.

(Step S1203)

The second processor 202 causes the second communication device 203 to repeatedly transmit the Advertising packet that is set in the process of Step S1202. Then, the process advances to Step S1204.

(Step S1204)

The second processor 202 determines whether a first repeat transmission duration has elapsed. When it is determined that a first repeat transmission duration has elapsed, the process advances to Step S1205. On the other hand, when it is determined that a first repeat transmission duration has not elapsed, the process of Step S1204 is repeated. In addition, although not shown, before a first repeat transmission duration has elapsed, when the second communication device 203 receives a Scan Request packet from another terminal including an imaging terminal, the second processor 202 causes the second communication device 203 to transmit a Scan Response packet to the other terminal which is a transmission source of a Scan Request packet and repeat the process of Step S204, and does not determine that the other terminal has received the imaging instruction control command. Further, before a first repeat transmission duration has elapsed, when the second communication device 203 receives a Connect Request packet from another terminal including an imaging terminal and establishes a connection with the other terminal, the second processor 202 instructs the second communication device 203 to perform disconnection, disconnects a connection with the other terminal, repeats the process of Step S204, and does not determine that the other terminal has received the imaging instruction control command.

(Step S1205)

The second processor 202 causes the second communication device 203 to stop repetitive transmission of an Advertising packet. Then, the process advances to Step S1206.

(Step S1206)

The second processor 202 sets a control command waiting for response and a parameter in an Advertising packet. Then, the process advances to Step S1207.

(Step S1207)

The second processor 202 causes the second communication device 203 to repeatedly transmit the Advertising packet that is set in the process of Step S1206. Then, the process advances to Step S1208.

(Step S1208)

The second processor 202 determines whether the second communication device 203 has received a Scan Request packet from the imaging terminal 101-$n$. When it is determined that the second communication device 203 has received a Scan Request packet from the imaging terminal 101-$n$, the process advances to Step S1209. On the other hand, when it is determined that the second communication device 203 has not received a Scan Request packet from the imaging terminal 101-$n$, the process advances to Step S1211.

(Step S1209)

The second processor 202 causes the second communication device 203 to transmit a Scan Response packet to the imaging terminal 101-$n$ which is a transmission source of a Scan Request packet. Then, the process advances to Step S1210.

(Step S1210)

The second processor 202 determines that the imaging terminal 101-$n$ has received an imaging instruction control command (confirms that an imaging instruction to the imaging terminal 101-$n$ has arrived). Then, the process advances to Step S1211.

(Step S1211)

The second processor 202 determines whether a second repeat transmission duration has elapsed. When it is determined that the second repeat transmission duration has elapsed, the process advances to Step S1212. On the other hand, when it is determined that the second repeat transmission duration has not elapsed, the process returns to Step S1208.

(Step S1212)

The second processor 202 causes the second communication device 203 to stop repetitive transmission of an Advertising packet. Then, the process ends.

Note that, in the above-described process, when the second processor 202 of the imaging instruction terminal 201 instructs the second communication device 203 to start transmission of an Advertising packet, a processor (not shown) in the second communication device 203 repeatedly transmits an Advertising packet until an Advertising packet transmission stop instruction is issued. Alternatively, the second processor 202 may transmit an individual Advertising packet transmission instruction to the second communication device 203 every time in a repeat transmission duration.

Figure 19:
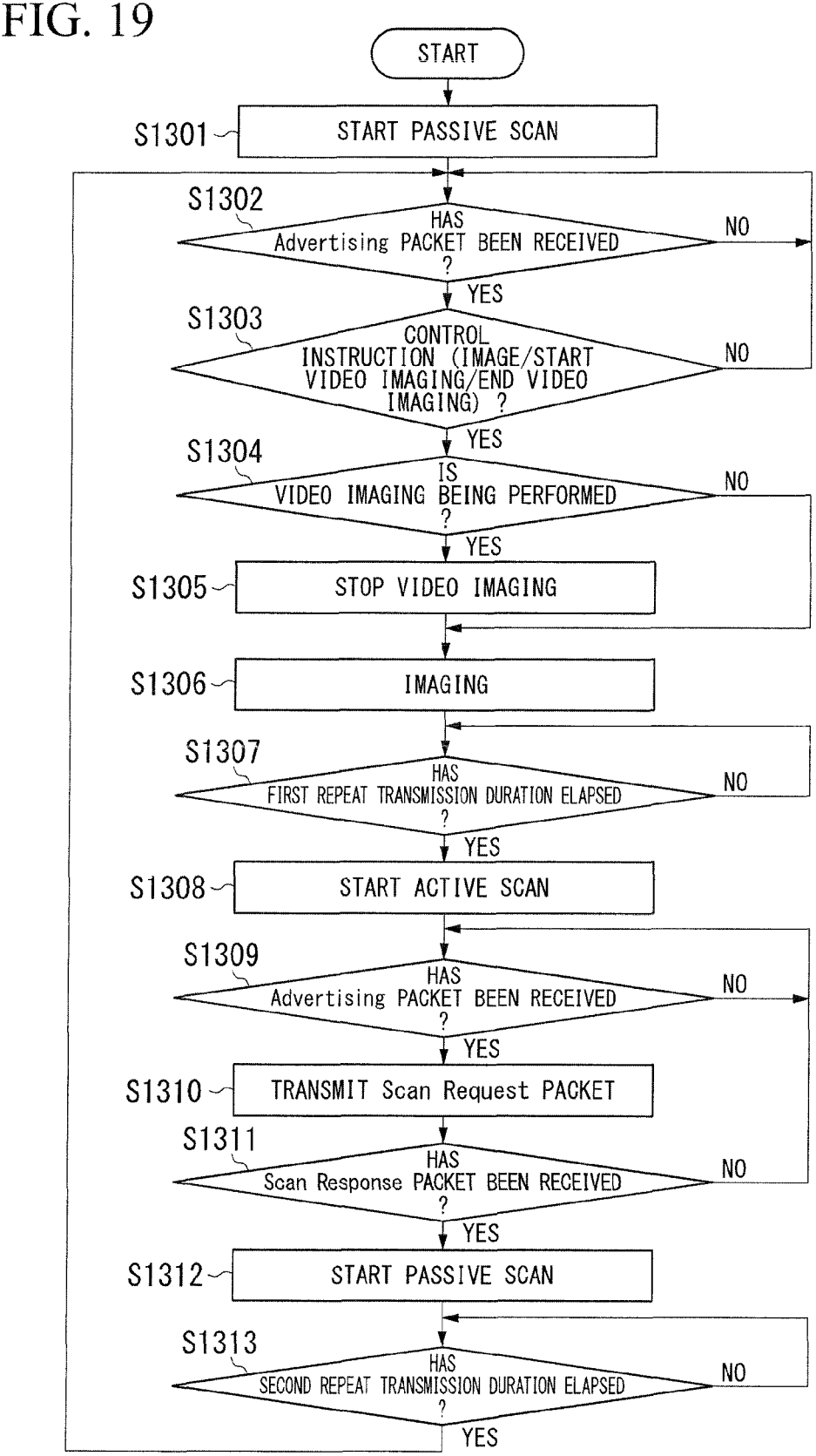
FIG. 19 is a flowchart showing operation procedures of an imaging terminal in the third embodiment of the present invention.

Next, operations of the imaging terminal 101 will be described. FIG. 19 is a flowchart showing operation procedures of the imaging terminal 101 according to this embodiment.

(Step S1301)

The first processor 102 of the imaging terminal 101 starts a passive scan. Then, the process advances to Step S1302.

(Step S1302)

The first processor 102 determines whether the first communication device 103 has received an Advertising packet from the imaging instruction terminal 201. When it is determined that an Advertising packet has been received, the process advances to Step S1303. On the other hand, when it is determined that an Advertising packet has not been received, the process of Step S1302 is repeated.

(Step S1303)

The first processor 102 acquires a Service UUID and a control command included in the Advertising packet that is determined to have been received in the process of Step S1302. When the acquired Service UUID is an ID indicating a simultaneous imaging control service and the control command is "image," "start video imaging," or "end video imaging," the process advances to Step S1304, and otherwise, the process returns to Step S1302.

(Step S1304)

The first processor 102 determines whether video imaging is being performed. When it is determined that video imaging is being performed, the process advances to Step S1305. On the other hand, when it is determined that no video imaging is being performed, the process advances to Step S1306.

(Step S1305)

The first processor 102 stops video imaging. Then, the process advances to Step S1306.

(Step S1306)

The first processor 102 performs imaging control based on the control command that is acquired in the process of Step S1303. Then, the process advances to Step S1307.

For example, when the control command acquired in the process of Step S1303 is an "imaging instruction," the first processor 102 causes the imaging device 105 to capture a still image. In addition, for example, when the control command acquired in the process of Step S1303 is "start video imaging," the first processor 102 causes the imaging device 105 to capture a moving image. In addition, for example, when the control command acquired in the process of Step S1303 is "end video imaging," the first processor 102 causes the imaging device 105 to end capturing of a moving image.

(Step S1307)

The first processor 102 determines whether a first repeat transmission duration has elapsed since the Advertising packet was received in the process of Step S1302. When it is determined that the first repeat transmission duration has elapsed since the Advertising packet was received in the process of Step S1302, the process advances to Step S1308. On the other hand, when it is determined that the first repeat transmission duration has not elapsed since the Advertising packet was received in the process of Step S1302, the process of Step S1307 is repeated.

(Step S1308)

The first processor 102 starts an active scan. Then, the process advances to Step S1309.

(Step S1309)

The first processor 102 determines whether the first communication device 103 has received an Advertising packet from the imaging instruction terminal 201. When it is determined that an Advertising packet has been received, the process advances to Step S1310. On the other hand, when it is determined that an Advertising packet has not been received, the process of Step S1309 is repeated.

(Step S1310)

The first processor 102 causes the first communication device 103 to transmit a Scan Request packet to the imaging instruction terminal 201. Then, the process advances to Step S1311.

(Step S1311)

The first processor 102 determines whether the first communication device 103 has received a Scan Response packet from the imaging instruction terminal 201. When it is determined that the Scan Response packet has been received, the process advances to Step S1312. On the other hand, when it is determined that no Scan Response packet has been received, the process returns to Step S1309.

(Step S1312)

The first processor 102 starts a passive scan. Then, the process advances to Step S1313.

(Step S1313)

The first processor 102 determines whether a second repeat transmission duration has elapsed since the active scan started in the process of Step S1308. When it is determined that the second repeat transmission duration has elapsed since the active scan started in the process of Step S1308, the process returns to Step S1302. On the other hand, when it is determined that the second repeat transmission duration has not elapsed since the active scan started in the process of Step S1308, the process of Step S1313 is repeated.

Also, in the above-described process, the first processor 102 may instruct the first communication device 103 to transmit a Scan Request packet according to an Advertising packet reception notification from the first communication device 103 or a processor (not shown) in the first communication device 103 may transmit a Scan Request packet using reception of an Advertising packet as a trigger based on an instruction of "start an active scan" from the first processor 102.

According to the above-described process, in this embodiment, in consideration of a control command that has not arrived, when one instruction (for example, an imaging instruction, a video imaging start instruction, or a video imaging end instruction) is transmitted, the imaging instruction terminal 201 repeatedly transmits an Advertising packet to which a control command is added in a repeat transmission duration. Therefore, it is possible to increase a probability of a control command (an imaging instruction) arriving at the imaging terminal 101.

Also, according to this embodiment, the imaging instruction terminal 201 repeatedly transmits an Advertising packet to which a control command is added in a repeat transmission duration when one imaging instruction is transmitted. Therefore, it is necessary for the imaging terminal 101 not to perform a process redundantly based on the instruction when an Advertising packet is repeatedly received. Therefore, in this embodiment, after an Advertising packet is received, even if an Advertising packet is received in the same duration as the repeat transmission duration, the imaging terminal 101 ignores a control command. Therefore, the imaging terminal 101 can prevent redundant execution of control commands that are repeatedly transmitted.

Also, according to this embodiment, the imaging instruction terminal 201 repeatedly transmits an Advertising packet waiting for response in a multi-address transmission manner in a second repeat transmission duration in order to confirm delivery after an Advertising packet of an imaging instruction is repeatedly transmitted (after a first repeat transmission duration has elapsed). Therefore, the imaging instruction terminal 201 can confirm the imaging terminal 101 that has completed imaging while preventing congestion occurring when an Advertising packet of an imaging instruction is transmitted.

Fourth Embodiment

Next, a fourth embodiment of the present invention will be described. Configurations of the imaging system 1, the imaging terminal 101, and the imaging instruction terminal 201 according to this embodiment are similar to those of the first embodiment.

Figure 20:
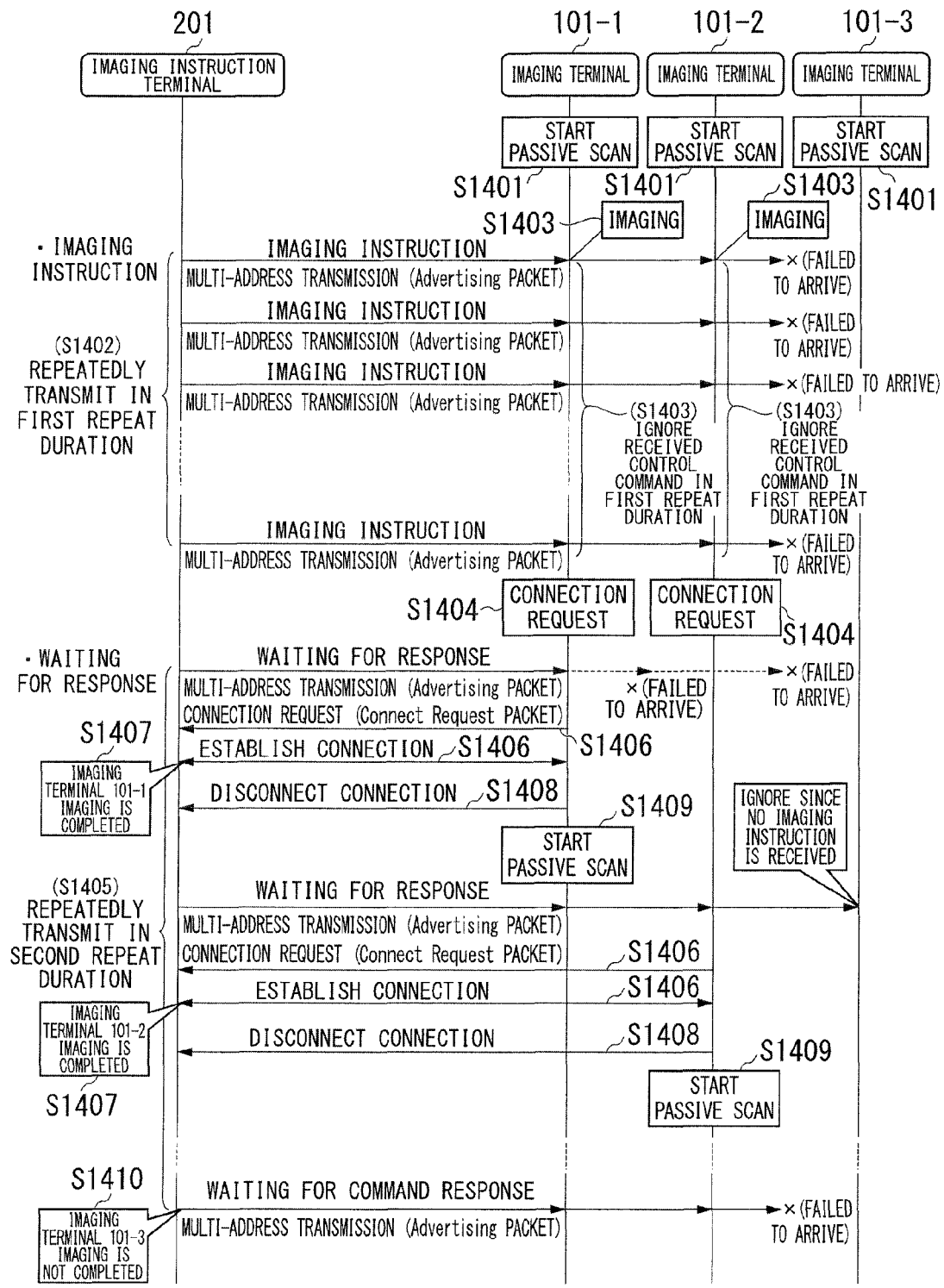
FIG. 20 is a sequence diagram showing procedures of transmitting an imaging instruction from an imaging instruction terminal in a fourth embodiment of the present invention to imaging terminals and confirming delivery of the imaging instruction.

In this embodiment, a connection request (Connect Request) is used to confirm whether an imaging instruction is delivered to the imaging terminal 101. FIG. 20 is a sequence diagram showing procedures of transmitting an imaging instruction from the imaging instruction terminal 201 to the imaging terminal 101 in this embodiment and confirming delivery of the imaging instruction.

Steps S1401 to S1403 are similar to Steps S1101 to S1103 shown in FIG. 17.

(Step S1404)

The imaging terminals 101-1 and 101-2 start a connection request process because the first repeat transmission duration has elapsed since the Advertising packet was received. The connection request process is a process in which, when an Advertising packet waiting for response is received, a connection request (Connect Request packet) is returned and a connection is established. Also, the imaging terminal 101-3 has not received an Advertising packet and therefore does not perform a process.

(Step S1405)

The imaging instruction terminal 201 repeatedly transmits an Advertising packet waiting for response in a multi-address transmission manner in a second repeat transmission duration in order to confirm delivery after the first repeat transmission duration has elapsed. In addition, the imaging instruction terminal 201 ends repetitive transmission of an Advertising packet waiting for response after the second repeat transmission duration has elapsed.

(Step S1406)

The imaging terminals 101-1 and 101-2 are performing a connection request process.

Therefore, when an Advertising packet waiting for response is received, the imaging terminals 101-1 and 101-2 transmit a Connect Request packet of a connection request and establish a connection. On the other hand, the imaging terminal 101-3 is in a passive scan. Therefore, the imaging terminal 101-3 does not perform a process even when an Advertising packet waiting for response is received. In the shown example, the imaging terminal 101-1 receives an Advertising packet waiting for response that is transmitted a first time. In addition, the imaging terminal 101-2 receives an Advertising packet waiting for response that is transmitted a second time.

(Step S1407)

When a connection is established, the imaging instruction terminal 201 determines that imaging performed by the imaging terminal 101 that has established the connection is completed. In the shown example, the imaging instruction terminal 201 determines that imaging performed by the imaging terminals 101-1 and 101-2 is completed.

(Step S1408)

After a connection is established, the imaging terminals 101-1 and 101-2 disconnect the connection.

(Step S1409)

The imaging terminals 101-1 and 101-2 start a passive scan when the connection is disconnected. Therefore, even when an Advertising packet waiting for response is received a plurality of times, it is possible to ignore an Advertising packet waiting for response that is received a second time and thereafter.

(Step S1410)

The imaging instruction terminal 201 determines that imaging performed by the imaging terminal 101 that has not received a ConnectScan Request packet of a connection request at a time point at which repetitive transmission of an Advertising packet waiting for response ends is not completed. In the shown example, the imaging instruction terminal 201 determines that imaging performed by the imaging terminal 101-3 is not completed.

Figure 21:
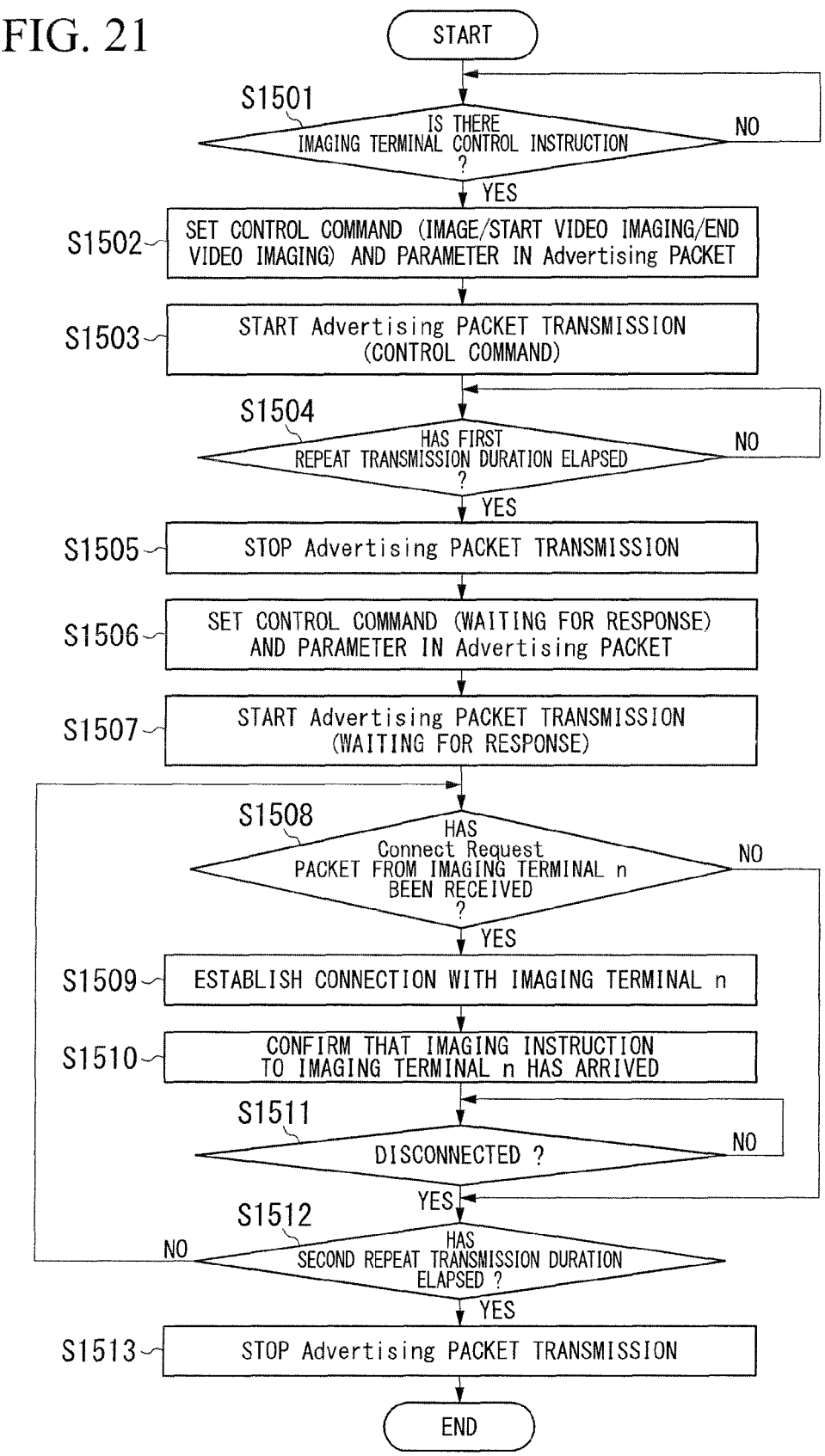
FIG. 21 is a flowchart showing operation procedures of the imaging instruction terminal in the fourth embodiment of the present invention.

Next, operations of the imaging instruction terminal 201 will be described. FIG. 21 is a flowchart showing operation procedures of the imaging instruction terminal 201 in this embodiment. Steps S1501 to S1507 are similar to Steps S1201 to S1207 in FIG. 18.

(Step S1508)

The second processor 202 determines whether the second communication device 203 has received a Connect Request packet from the imaging terminal 101-$n$. When it is determined that the second communication device 203 has received a Connect Request packet from the imaging terminal 101-$n$, the process advances to Step S1509. On the other hand, when it is determined that the second communication device 203 has not received a Connect Request packet from the imaging terminal 101-$n$, the process advances to Step S1512.

(Step S1509)

The second processor 202 causes the second communication device 203 to establish a connection with the imaging terminal 101-$n$ which is a transmission source of a Connect Request packet. Then, the process advances to Step S1510.

(Step S1510)

The second processor 202 determines that the imaging terminal 101-$n$ has received an imaging instruction control command (confirms that an imaging instruction to the imaging terminal 101-$n$ has arrived). Then, the process advances to Step S1511.

(Step S1511)

The second processor 202 determines whether the connection with the imaging terminal 101-$n$ that has been established in the process of Step S1509 is disconnected. When it is determined that the connection is disconnected, the process advances to Step S1512. On the other hand, when it is determined that the connection is not disconnected, the process of Step S1511 is repeated.

(Step S1512)

The second processor 202 determines whether a second repeat transmission duration has elapsed. When it is determined that the second repeat transmission duration has elapsed, the process advances to Step S1513. On the other hand, when it is determined that the second repeat transmission duration has not elapsed, the process returns to Step S1508.

(Step S1513)

The second processor 202 causes the second communication device 203 to stop repetitive transmission of an Advertising packet. Then, the process ends.

Also, in the above-described process, the connection with the imaging terminal 101-$n$ is disconnected in the process of Step S1511. However, the present invention is not limited thereto, and the connection with the imaging instruction terminal 201 may be disconnected.

Figure 22:
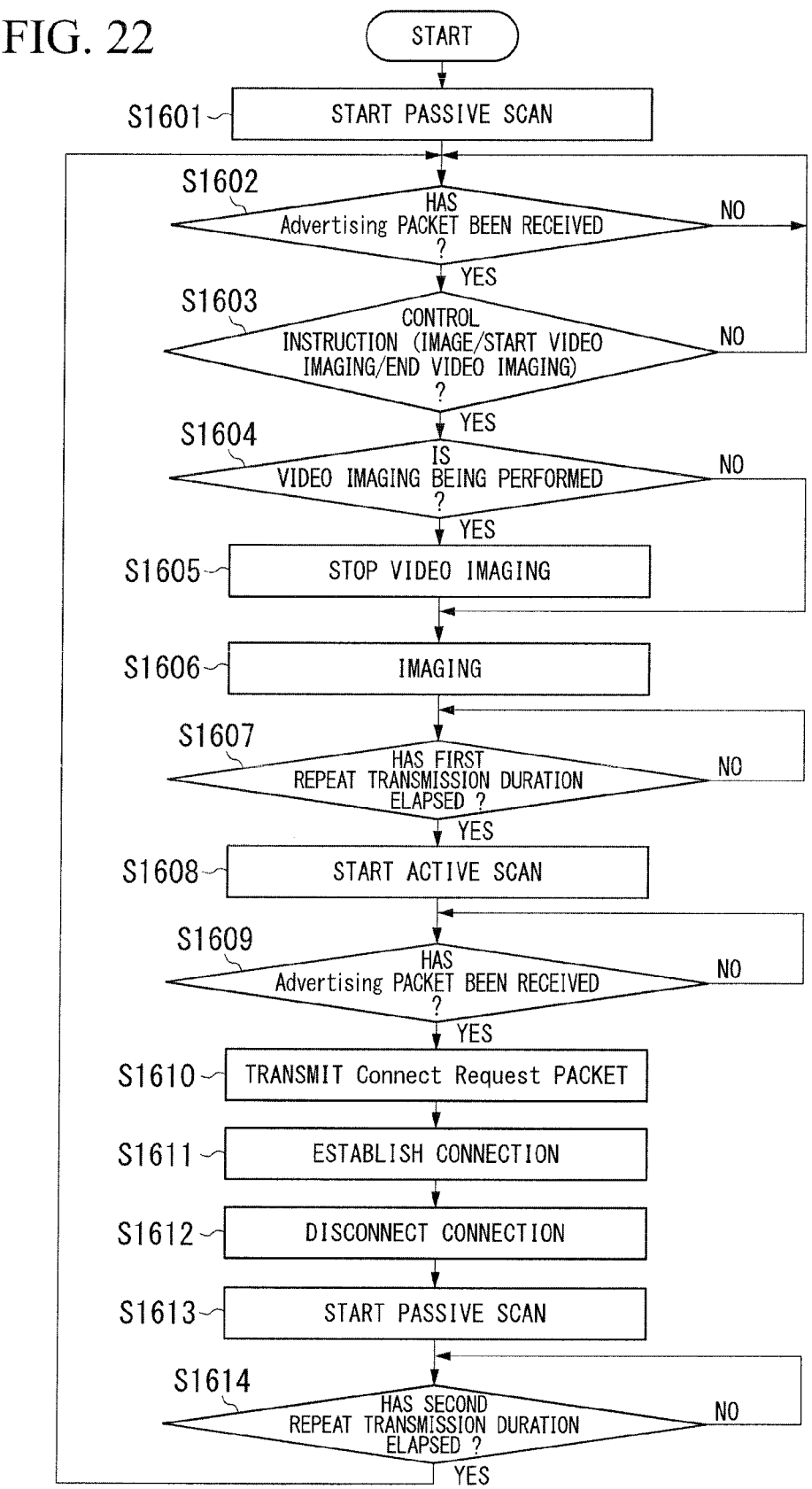
FIG. 22 is a flowchart showing operation procedures of an imaging terminal according to the fourth embodiment of the present invention.

Next, operations of the imaging terminal 101 will be described. FIG. 22 is a flowchart showing operation procedures of the imaging terminal 101 according to this embodiment. Steps S1601 to S1607 are similar to Steps S1301 to S1307 in FIG. 19.

(Step S1608)

The first processor 102 starts a connection process. Then, the process advances to Step S1609.

(Step S1609)

The first processor 102 determines whether the first communication device 103 has received an Advertising packet from the imaging instruction terminal 201. When it is determined that an Advertising packet has been received, the process advances to Step S1610. On the other hand, when it is determined that an Advertising packet has not been received, the process of Step S1609 is repeated.

(Step S1610)

The first processor 102 causes the first communication device 103 to transmit a Connect Request packet to the imaging instruction terminal 201. Then, the process advances to Step S1611.

(Step S1611)

The first processor 102 causes the first communication device 103 to establish a connection with the imaging instruction terminal 201. Then, the process advances to Step S1612.

(Step S1612)

The first processor 102 causes the first communication device 103 to disconnect the connection that is established in the process of Step S1611. Then, the process advances to Step S1613.

(Step S1613)

The first processor 102 starts a passive scan. Then, the process advances to Step S1614.

(Step S1614)

The first processor 102 determines whether a second repeat transmission duration has elapsed since the connection process started in the process of Step S1608. When it is determined that the second repeat transmission duration has elapsed since the connection process started in the process of Step S1608, the process returns to Step S1602. On the other hand, when it is determined that the second repeat transmission duration has not elapsed since the connection process started in the process of Step S1608, the process of Step S1614 repeated.

Also, in the above-described process, before the connection request (Connect Request packet) is transmitted, an active scan may be performed (receive an Advertising packet→transmit a Scan Request packet→receive a Scan Response packet). In addition, the disconnection may be performed by either the imaging terminal 101 or the imaging instruction terminal 201.

In addition, according to an Advertising packet reception notification from the first communication device 103, the first processor 102 may instruct the first communication device 103 to transmit a Connect Request packet. In addition, a processor (not shown) in the first communication device 103 may transmit a Connect Request packet using reception of an Advertising packet as a trigger based on a connection process start instruction from the first processor 102.

According to the above-described process, in this embodiment, in consideration of a control command that has not arrived, when one instruction (for example, an imaging instruction, a video imaging start instruction, or a video imaging end instruction) is transmitted, the imaging instruction terminal 201 repeatedly transmits an Advertising packet to which a control command is added in a repeat transmission duration. Therefore, it is possible to increase a probability of a control command (an imaging instruction) arriving at the imaging terminal 101.

Also, according to this embodiment, the imaging instruction terminal 201 repeatedly transmits an Advertising packet to which a control command is added in a repeat transmission duration when one imaging instruction is transmitted. Therefore, it is necessary for the imaging terminal 101 not to perform a process redundantly based on the instruction when an Advertising packet is repeatedly received. Therefore, in this embodiment, after an Advertising packet is received, even if an Advertising packet is received in the same duration as the repeat transmission duration, the imaging terminal 101 ignores a control command. Therefore, the imaging terminal 101 can prevent redundant execution of control commands that are repeatedly transmitted.

Also, according to this embodiment, the imaging instruction terminal 201 repeatedly transmits an Advertising packet waiting for response in a multi-address transmission manner in a second repeat transmission duration in order to confirm delivery after an Advertising packet of an imaging instruction is repeatedly transmitted (after a first repeat transmission duration has elapsed). Therefore, the imaging instruction terminal 201 can confirm the imaging terminal 101 that has completed imaging while preventing congestion occurring when an Advertising packet of an imaging instruction is transmitted.

Also, as described above, the imaging instruction terminal 201 in the third embodiment and the fourth embodiment can distinguish between the imaging terminal 101 that has completed imaging and the imaging terminal 101 that has not completed imaging. Therefore, for example, the imaging instruction terminal 201 stores (registers) the number of imaging terminals 101 included in the imaging system 1 in the second memory 204 in advance, compares it with the number of imaging terminals 101 from which a response is returned, and therefore can assess whether all of the imaging terminals 101 included in the imaging system 1 have completed imaging.

In addition, for example, the imaging instruction terminal 201 stores (registers) information for identifying individual imaging devices such as an identifier (BD_ADDR) and a terminal name that are uniquely assigned to each of the imaging terminals 101 in the second memory 204 in advance, compares it with an identifier of the imaging terminal 101 from which a response is returned, therefore can determine an imaging terminal 101 has completed imaging or failed in imaging, and further can exclude a terminal whose information for identification is not stored (registered) as a terminal that is not compatible in this embodiment in S1208 and S1508 from determination targets.

Figure 23:
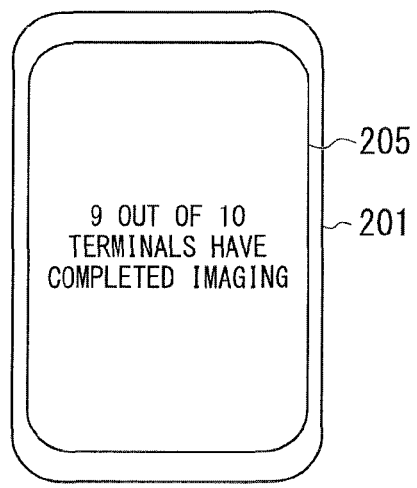
FIG. 23 is a schematic diagram showing an example of a determination result display screen that is displayed on a display unit by the imaging instruction terminal in the fourth embodiment of the present invention.
Figure 24:
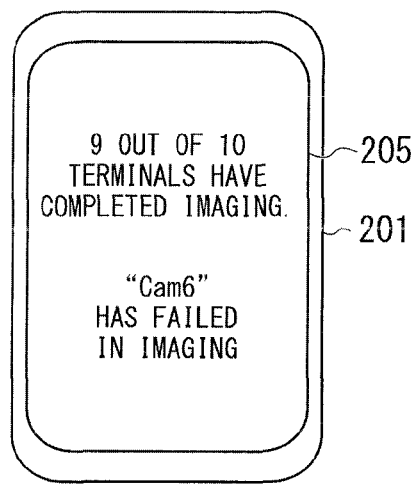
FIG. 24 is a schematic diagram showing an example of a determination result display screen that is displayed on a display unit by the imaging instruction terminal in the fourth embodiment of the present invention.
Figure 25:
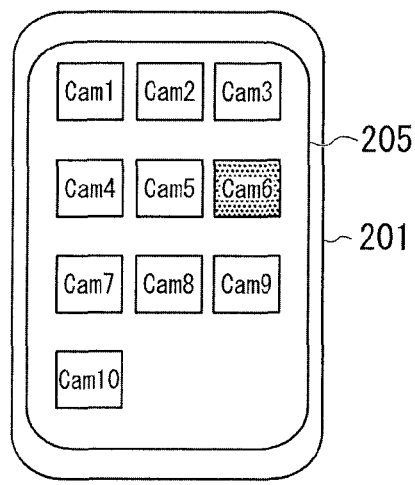
FIG. 25 is a schematic diagram showing an example of a determination result display screen that is displayed on a display unit by the imaging instruction terminal in the fourth embodiment of the present invention.

In addition, the imaging instruction terminal 201 causes the display unit 205 (a user notification unit) to display the determination result. FIG. 23 to FIG. 25 are schematic diagrams showing examples of determination result display screens that are displayed on the display unit 205 by the imaging instruction terminal 201 in this embodiment.

In the example shown in FIG. 23, the imaging instruction terminal 201 displays "9/10 terminals have completed imaging" on the display unit 205 as a determination result display screen. This represents that the number of imaging terminals 101 included in the imaging system 1 is 10 and the number of imaging terminals 101 that have completed imaging is 9. In this manner, the imaging instruction terminal 201 may display the number of imaging terminals 101 included in the imaging system 1 and the number of imaging terminals 101 that have completed imaging as a determination result display screen.

In the example shown in FIG. 24, the imaging instruction terminal 201 displays "9/10 terminals have completed imaging, and "Cam6" failed in imaging" on the display unit 205 as a determination result display screen. This represents that the number of imaging terminals 101 included in the imaging system 1 is 10 and the number of imaging terminals 101 that have completed imaging is 9. In addition, it represents that the imaging terminal 101 having a terminal name of "Cam6" among the imaging terminals 101 failed in imaging.

In this manner, the imaging instruction terminal 201 may display the number of imaging terminals 101 included in the imaging system 1 and the number of imaging terminals 101 that have completed imaging as a determination result display screen. Moreover, the imaging instruction terminal 201 may also display information for specifying the imaging terminal 101 that failed in imaging.

In the example shown in FIG. 25, the imaging instruction terminal 201 displays icons of "Cam1" to "Cam10" on the display unit 205 as a determination result display screen and displays "Cam6" whose icon is uniquely grayed out. This represents that the imaging terminals 101 whose terminal names are "Cam1" to "Cam10" are included in the imaging system 1, and the imaging terminal 101 whose terminal name is "Cam6" failed in imaging.

In this manner, the imaging instruction terminal 201 may display icons for specifying the imaging terminals 101 included in the imaging system 1 as a determination result display screen. In addition, the imaging instruction terminal 201 may display an icon for specifying the imaging terminal 101 that has completed imaging and an icon for specifying the imaging terminal 101 that failed in imaging in different display modes.

In addition, the imaging instruction terminal 201 may include a speaker (a user notification unit) that is not shown and output the determination result as sound from the speaker. For example, the imaging instruction terminal 201 may output "9 out of 10 terminals have completed imaging" as sound from the speaker as a determination result. This represents that the number of imaging terminals 101 included in the imaging system 1 is 10 and the number of imaging terminals 101 that have completed imaging is 9. In this manner, the imaging instruction terminal 201 may output the number of imaging terminals 101 included in the imaging system 1 and the number of imaging terminals 101 that have completed imaging as sound as a determination result.

Also, the above-described first repeat transmission duration may have a predetermined value. However, since a probability of an Advertising packet not arriving increases depending on environments, it is possible to correspond to the environment by changing the repeat transmission duration and the transmission interval to any value and increasing or decreasing the number of multi-address transmissions. For example, when a wireless communication environment is poor, it is possible to increase the number of Advertising packet transmissions and decrease a probability of an Advertising packet not arriving by increasing the repeat transmission duration and decreasing the transmission interval.

In this case, the imaging instruction terminal 201 sets a control command and any first repeat transmission duration in an Advertising packet of an imaging instruction as parameters and transmits the packet in a multi-address transmission manner. Therefore, the imaging terminal 101 refers to any first repeat transmission duration that is set in the Advertising packet of the imaging instruction, and even if the imaging instruction terminal 201 changes the first repeat transmission duration randomly, the changed first repeat transmission duration can be recognized.

In addition, similarly, in the above-described second repeat transmission duration, it is possible to optimally respond to environments by changing the second repeat transmission duration to any value and increasing or decreasing the number of multi-address transmissions.

In this case also, the imaging instruction terminal 201 sets a control command and any second repeat transmission duration in an Advertising packet waiting for response as parameters and transmits the packet in a multi-address transmission manner. Therefore, the imaging terminal 101 refers to any second repeat transmission duration set in the Advertising packet waiting for response as a parameter, and even if the imaging instruction terminal 201 changes the second repeat transmission duration randomly, the changed second repeat transmission duration can be recognized.

Also, all or some functions of components included in the imaging terminal 101 according to the above-described embodiment and all or some functions of components included in the imaging instruction terminal 201 according to the above-described embodiment may be implemented such that a program for implementing such functions is recorded in a computer-readable recording medium and a computer system loads and executes the program recorded in the recording medium. Also, the "computer system" referred to here includes an OS and hardware such as a peripheral device.

In addition, the "computer-readable recording medium" refers to a portable medium such as a flexible disk, a magneto-optical disc, a ROM, and a CD-ROM, and a storage unit such as a hard disk that is built into a computer system. Further, the "computer-readable recording medium" may be a medium that dynamically stores a program for a short time through a communication channel when the program is transmitted via a network such as the Internet or a communication line such as a telephone line or that stores a program for a specified time, such as a volatile memory inside a computer system serving as a server or a client in this case. In addition, the program may implement some of the above-described functions and further implement the above-described functions in combination with a program that is already recorded in a computer system.

While exemplary embodiments of the present invention have been described above, the present invention is not limited to these embodiments. Additions, omissions, substitutions and other modifications of the components can be made without departing from the scope of the present invention. For example, while a case in which communication between the imaging terminal 101 and the imaging instruction terminal 201 is Bluetooth has been described in the above-described example, the present invention is not limited thereto, and any communication, for example, a wireless LAN, infrared communication, and ultrasonic communication, may be used.

In addition, the present invention is not limited to the above description, and is only limited by the scope of the appended claims.

What is claimed is:

1. An imaging system that includes an imaging instruction terminal and an imaging terminal,
wherein the imaging instruction terminal includes
an imaging instruction terminal communication unit configured to wirelessly communicate with the imaging terminal; and
an imaging instruction terminal control unit configured to perform control such that a specific multi-address packet of a data link level including a parameter indicating a first duration and an imaging instruction signal is transmitted to the imaging terminal,
wherein the imaging terminal includes
an imaging terminal communication unit configured to wirelessly communicate with the imaging instruction terminal;
an imaging unit configured to capture an image; and
an imaging terminal control unit configured to perform imaging control such that the imaging unit captures an image in response to the specific multi-address packet that is wirelessly transmitted from the imaging instruction terminal,
wherein the imaging instruction terminal control unit repeatedly transmits the specific multi-address packet in the first duration when a communication connection of a data link level with the imaging terminal is not established, and
wherein, when a time point at which the imaging terminal communication unit has received the specific multi-address packet is referred to as a first time point, the imaging terminal control unit performs the imaging control in response to the specific multi-address packet that has been received at the first time point, and does not perform the imaging control in response to the specific multi-address packet that is newly received in the first duration after the first time point.

2. The imaging system according to claim 1,
wherein the control unit performs control such that the captured image is stored together with the parameter.

3. An imaging terminal, comprising:
an imaging terminal communication unit configured to wirelessly communicate with an imaging instruction terminal;
an imaging unit configured to capture an image; and
an imaging terminal control unit configured to perform imaging control such that the imaging unit captures an image in response to a specific multi-address packet of a data link level including a parameter indicating a first duration and an imaging instruction signal that is wirelessly transmitted from the imaging instruction terminal,
wherein, when a time point at which the imaging terminal communication unit has received the specific multi-address packet is referred to as a first time point, the imaging terminal control unit performs the imaging control in response to the specific multi-address packet that has been received at the first time point, and does not perform the imaging control in response to the specific multi-address packet that is newly received in the first duration after the first time point.

4. The imaging terminal according to claim 3,
wherein the control unit performs control such that the captured image is stored together with the parameter.

5. An imaging terminal, comprising:
an imaging terminal communication unit configured to wirelessly communicate with an imaging instruction terminal;
an imaging unit configured to capture a moving image; and
an imaging terminal control unit configured to perform moving image imaging control such that the imaging unit starts to capture a moving image in response to a specific multi-address packet of a data link level including a parameter indicating a first duration and an imaging instruction signal that is wirelessly transmitted from the imaging instruction terminal,
wherein, when a time point at which the imaging terminal communication unit has received the specific multi-address packet is referred to as a first time point, the imaging terminal control unit performs the moving image imaging control in response to the specific multi-address packet that has been received at the first time point, and does not perform the moving image imaging control in response to the specific multi-address packet that is newly received in the first duration after the first time point.

6. The imaging terminal according to claim 5,
wherein, when the specific multi-address packet is received after the first duration has elapsed since the first time point, the imaging terminal control unit performs the moving image imaging control such that, if the moving image is being captured, capturing of a new moving image starts after ending the capturing of the moving image.

7. The imaging terminal according to claim 5,
wherein the control unit performs control such that the captured moving image is stored together with the parameter.

8. An imaging system that includes an imaging instruction terminal and an imaging terminal,
wherein the imaging instruction terminal includes
an imaging instruction terminal communication unit configured to wirelessly communicate with the imaging terminal; and
an imaging instruction terminal control unit configured to perform control such that a specific multi-address packet of a data link level including a parameter indicating a first duration, a parameter indicating a first interval or the number of transmissions, and an imaging instruction signal is transmitted to the imaging terminal,
wherein the imaging terminal includes
an imaging terminal communication unit configured to wirelessly communicate with the imaging instruction terminal;
an imaging unit configured to capture an image; and
an imaging terminal control unit configured to perform imaging control such that the imaging unit captures an image in response to the specific multi-address packet that is wirelessly transmitted from the imaging instruction terminal,
wherein, when a communication connection of a data link level with the imaging terminal is not established, the imaging instruction terminal control unit repeatedly transmits the specific multi-address packet at the first interval or according to the number of transmissions in the first duration, and
wherein, when a time point at which the imaging terminal communication unit has received the specific multi-address packet is referred to as a first time point, the imaging terminal control unit performs the imaging control repeatedly at the first interval or according to the number of transmissions in the first duration in response to the specific multi-address packet that has been received at the first time point, and does not perform the imaging control in response to the specific multi-address packet that is newly received in the first duration after the first time point.

9. The imaging system according to claim 8,
wherein the control unit performs control such that the captured image is stored together with the parameters.

10. An imaging terminal, comprising:
an imaging terminal communication unit configured to wirelessly communicate with an imaging instruction terminal;
an imaging unit configured to capture an image; and
an imaging terminal control unit configured to perform imaging control such that the imaging unit captures an image in response to a specific multi-address packet of a data link level including a parameter indicating a first duration, a parameter indicating a first interval or the number of transmissions and an imaging instruction signal that is wirelessly transmitted from the imaging instruction terminal,
wherein, when a time point at which the imaging terminal communication unit has received the specific multi-address packet is referred to as a first time point, the imaging terminal control unit performs the imaging control repeatedly at the first interval or according to the number of transmissions in the first duration in response to the specific multi-address packet that has been received at the first time point, and does not perform the imaging control in response to the specific multi-address packet that is newly received in the first duration after the first time point.

11. The imaging terminal according to claim 10,
wherein the control unit performs control such that the captured image is stored together with the parameters.

12. An imaging terminal, comprising:
an imaging terminal communication unit configured to wirelessly communicate with an imaging instruction terminal;
an imaging unit configured to capture a moving image; and
an imaging terminal control unit configured to perform moving image imaging control such that the imaging unit starts to capture a moving image in response to a specific multi-address packet of a data link level including a parameter indicating a first duration, a parameter indicating a first interval or the number of transmissions and an imaging instruction signal that is wirelessly transmitted from the imaging instruction terminal, and
wherein, when a time point at which the imaging terminal communication unit has received the specific multi-address packet is referred to as a first time point, the imaging terminal control unit performs the moving image imaging control in response to the specific multi-address packet that has been received at the first time point, performs control such that the parameters are superimposed as an index of the captured moving image and stored, and does not perform the moving image imaging control in response to the specific multi-address packet that is newly received in the first duration after the first time point.

13. The imaging terminal according to claim 12,
wherein the control unit performs control such that the captured moving image is stored together with the parameters.

14. An imaging system that includes an imaging instruction terminal and an imaging terminal,
wherein the imaging instruction terminal includes
an imaging instruction terminal communication unit configured to wirelessly communicate with the imaging terminal; and
an imaging instruction terminal control unit configured to perform control such that a specific multi-address packet of a data link level including a parameter indicating a first duration, a parameter indicating a first interval or the number of transmissions, a packet number that is calculated as a value that differs according to a unique rule for each transmission using a packet number of a specific multi-address packet that is initially transmitted as a starting point and an imaging instruction signal is transmitted to the imaging terminal,
wherein the imaging terminal includes
an imaging terminal communication unit configured to wirelessly communicate with the imaging instruction terminal;
an imaging unit configured to capture an image; and
an imaging terminal control unit configured to perform imaging control such that the imaging unit captures an image in response to the specific multi-address packet that is wirelessly transmitted from the imaging instruction terminal,
wherein the imaging instruction terminal control unit repeatedly transmits the specific multi-address packet at the first interval or according to the number of transmissions in the first duration when a communication connection of a data link level with the imaging terminal is not established, and
wherein, when a time point at which the imaging terminal communication unit has received the specific multi-address packet is referred to as a first time point, the imaging terminal control unit performs the imaging control repeatedly at the first interval or according to the number of transmissions in the first duration in response to the specific multi-address packet that has been received at the first time point and performs control such that, whenever an image is captured under the imaging control, the captured image is stored together with a value that is obtained according to the unique rule using a packet number of the specific multi-address packet that is received for the first time after the first time point as a starting point.

* * * * *